(12) United States Patent
Wolfe et al.

(10) Patent No.: US 12,458,514 B2
(45) Date of Patent: Nov. 4, 2025

(54) METAPHYSEAL REFERENCING TECHNIQUE AND INSTRUMENT

(71) Applicant: HOWMEDICA OSTEONICS CORP., Mahwah, NJ (US)

(72) Inventors: Alexander Paul Wolfe, Fort Wayne, IN (US); David R. Stump, Columbia City, IN (US)

(73) Assignee: HOWMEDICA OSTEONICS CORP., Mahwah, NJ (US)

( * ) Notice: Subject to any disclaimer, the term of this patent is extended or adjusted under 35 U.S.C. 154(b) by 710 days.

(21) Appl. No.: 17/276,925

(22) PCT Filed: Oct. 1, 2019

(86) PCT No.: PCT/US2019/054024
§ 371 (c)(1),
(2) Date: Mar. 17, 2021

(87) PCT Pub. No.: WO2020/072466
PCT Pub. Date: Apr. 9, 2020

(65) Prior Publication Data
US 2021/0338456 A1 Nov. 4, 2021

Related U.S. Application Data

(60) Provisional application No. 62/740,257, filed on Oct. 2, 2018.

(51) Int. Cl.
*A61F 2/46* (2006.01)
*A61B 17/17* (2006.01)
(Continued)

(52) U.S. Cl.
CPC .......... *A61F 2/4612* (2013.01); *A61F 2/4003* (2013.01); *A61B 17/1684* (2013.01);
(Continued)

(58) Field of Classification Search
CPC .. A61F 2/4612; A61F 2/4003; A61B 17/1778; A61B 17/1684; A61B 17/15; A61B 17/175
See application file for complete search history.

(56) References Cited

U.S. PATENT DOCUMENTS

| | | | |
|---|---|---|---|
| 4,662,891 | A | 5/1987 | Noiles |
| 5,030,219 | A | 7/1991 | Matsen, III et al. |

(Continued)

FOREIGN PATENT DOCUMENTS

| | | | |
|---|---|---|---|
| CA | 2209498 A1 | 8/1996 | |
| CN | 105263446 A | 1/2016 | |

(Continued)

OTHER PUBLICATIONS

First Office Action issued in connection with Japanese Patent Application No. 2021-518141, Jun. 21, 2022, 3 pages.
(Continued)

*Primary Examiner* — Brian A Dukert
(74) *Attorney, Agent, or Firm* — DUANE MORRIS LLP

(57) ABSTRACT

A system for sizing the resected surface to provide metaphyseal referencing and to properly guide a tool into a central portion of the canal in the diaphysis. The system can include a sizing feature to approximate the size of the metaphysis. The system can also include a base configured to contact the metaphysis and a guide feature configured to guide a tool along a central portion of the canal in the diaphysis.

37 Claims, 21 Drawing Sheets

(51) Int. Cl.
  *A61F 2/40* (2006.01)
  *A61B 17/16* (2006.01)
(52) U.S. Cl.
  CPC ... *A61B 17/1778* (2016.11); *A61F 2002/4659* (2013.01); *A61F 2002/4687* (2013.01)

(56) References Cited

U.S. PATENT DOCUMENTS

| | | | |
|---|---|---|---|
| 5,769,856 A * | 6/1998 | Dong | A61B 17/1778 606/80 |
| 5,779,710 A * | 7/1998 | Matsen, III | A61B 17/15 606/102 |
| 6,143,012 A | 11/2000 | Gausepohl | |
| 6,283,999 B1 | 9/2001 | Rockwood, Jr. | |
| 6,398,812 B1 | 6/2002 | Masini | |
| 7,353,153 B2 | 4/2008 | Ascenzi et al. | |
| 7,527,631 B2 | 5/2009 | Maroney et al. | |
| 8,062,299 B2 | 11/2011 | McGahan et al. | |
| 8,078,440 B2 | 12/2011 | Otto et al. | |
| 8,277,450 B2 | 10/2012 | Dees, Jr. et al. | |
| 8,545,506 B2 | 10/2013 | Long et al. | |
| 8,768,674 B2 | 7/2014 | Darwish et al. | |
| 9,271,744 B2 | 3/2016 | Meridew | |
| 9,408,616 B2 | 8/2016 | Kehres et al. | |
| 9,498,233 B2 | 11/2016 | Eash | |
| 9,662,219 B2 | 5/2017 | Bonin, Jr. et al. | |
| 9,763,682 B2 | 9/2017 | Bettenga | |
| 11,703,096 B2 | 7/2023 | Denhard et al. | |
| 2003/0014119 A1 | 1/2003 | Capon et al. | |
| 2003/0060889 A1 | 3/2003 | Tarabishy | |
| 2005/0107797 A1 | 5/2005 | Romeo | |
| 2006/0009854 A1 | 1/2006 | Justin et al. | |
| 2007/0244565 A1 | 10/2007 | Stchur | |
| 2008/0004517 A1 | 1/2008 | Bhandarkar et al. | |
| 2009/0270867 A1 * | 10/2009 | Poncet | A61B 17/1684 606/80 |
| 2010/0049260 A1 | 2/2010 | Long et al. | |
| 2010/0234850 A1 | 9/2010 | Dees, Jr. et al. | |
| 2011/0224673 A1 | 9/2011 | Smith | |
| 2011/0224799 A1 | 9/2011 | Stone | |
| 2011/0282462 A1 | 11/2011 | Wunderle et al. | |
| 2012/0035733 A1 | 2/2012 | Porter et al. | |
| 2012/0296339 A1 * | 11/2012 | Iannotti | A61B 17/1703 606/86 R |
| 2013/0041376 A1 | 2/2013 | Neal et al. | |
| 2013/0204259 A1 | 8/2013 | Zajac | |
| 2013/0261622 A1 | 10/2013 | Bonjour et al. | |
| 2013/0325430 A1 | 12/2013 | Darwish et al. | |
| 2014/0012266 A1 | 1/2014 | Bonin et al. | |
| 2014/0074174 A1 | 3/2014 | Schacherer et al. | |
| 2014/0276850 A1 * | 9/2014 | Chaney | A61F 2/461 606/84 |
| 2014/0330390 A1 | 11/2014 | Liu et al. | |
| 2014/0363481 A1 | 12/2014 | Pasini et al. | |
| 2015/0190237 A1 | 7/2015 | Bonin, Jr. et al. | |
| 2016/0158021 A1 | 6/2016 | Goldberg et al. | |
| 2016/0287266 A1 * | 10/2016 | Sikora | A61F 2/4081 |
| 2016/0287395 A1 | 10/2016 | Khalili et al. | |
| 2017/0049573 A1 | 2/2017 | Hodorek et al. | |
| 2017/0079800 A1 | 3/2017 | Messieh | |
| 2017/0239058 A1 | 8/2017 | Goldberg | |
| 2017/0304063 A1 | 10/2017 | Hatzidakis et al. | |
| 2017/0333215 A1 | 11/2017 | Wolfson et al. | |
| 2018/0250138 A1 | 9/2018 | Alidousti et al. | |
| 2018/0318093 A1 | 11/2018 | Kirwan | |
| 2019/0015119 A1 * | 1/2019 | Athwal | A61B 17/1684 |
| 2019/0167356 A1 | 6/2019 | Britton et al. | |
| 2019/0231544 A1 | 8/2019 | Boileau et al. | |
| 2019/0274697 A1 | 9/2019 | Santangelo et al. | |
| 2019/0298543 A1 | 10/2019 | Hashida et al. | |
| 2023/0101690 A1 | 3/2023 | Harder et al. | |

FOREIGN PATENT DOCUMENTS

| | | |
|---|---|---|
| DE | 19532898 A1 | 3/1997 |
| EP | 1269941 A1 | 1/2003 |
| EP | 1048274 B1 | 9/2012 |
| EP | 2668928 B1 | 3/2015 |
| EP | 2623045 B1 | 9/2015 |
| JP | 2013521889 A | 6/2013 |
| TW | I606813 B | 12/2017 |
| WO | 2014035991 A1 | 3/2014 |
| WO | 2020072466 A1 | 4/2020 |

OTHER PUBLICATIONS

International Search Report and Written Opinion dated Mar. 22, 2021 in connection with International Patent Appln. No. PCT/US2021/02343.
Partial European Search Report issued in connection with European Patent Application No. 21775719.4, Dec. 7, 2023, 13 pages.
International Search Report for PCT/US2019/054024 mailed Jan. 20, 2020.
International Search Report and Written Opinion issued in connection with International Patent Application No. PCT/US2019/054024, 18 pages, Jan. 20, 2020.
Arthrex Releases Univers ReversTM Shoulder Arthroplasty System in the United States—First Surgery Successfully Performed in Chillicothe, OH, 2013, 2 pages.
Humphrey et al., A Method to Facilitate Improved Positioning of a Reverse Prosthesis Stem During Arthroplasty Surgery: The Metaphyseal-centering Technique, Techniques in Shoulder & Elbow Surgery, Jun. 2018, vol. 19, No. 2, pp. 67-74.
Non-Final Office Action issued in connection with U.S. Appl. No. 16/967,374, Jul. 26, 2023, 7 pages.
Extended European Search Report issued in connection with European Patent Application No. 21775719.4, Feb. 20, 2024, 15 pages.
First Office Action issued in connection with Chinese Patent Application No. 201910110195.8, Feb. 21, 2024, 12 pages.
First Office Action issued in connection with Canadian Patent Application No. 3,089,708, Jun. 7, 2024, 9 pages.
Non-Final Office Action issued in connection with U.S. Appl. No. 17/793,447, Mar. 6, 2023, 13 pages.
Non-Final Office Action issued in connection with U.S. Appl. No. 17/648,963, Feb. 6, 2025, 22 pages.

* cited by examiner

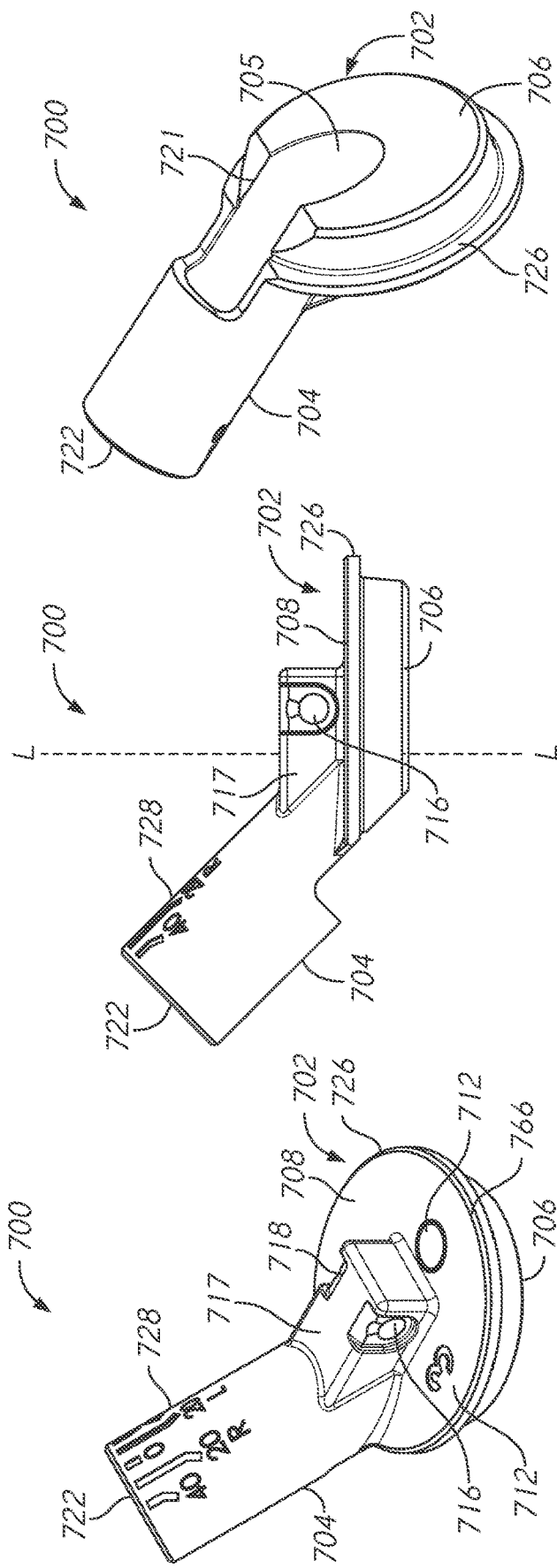

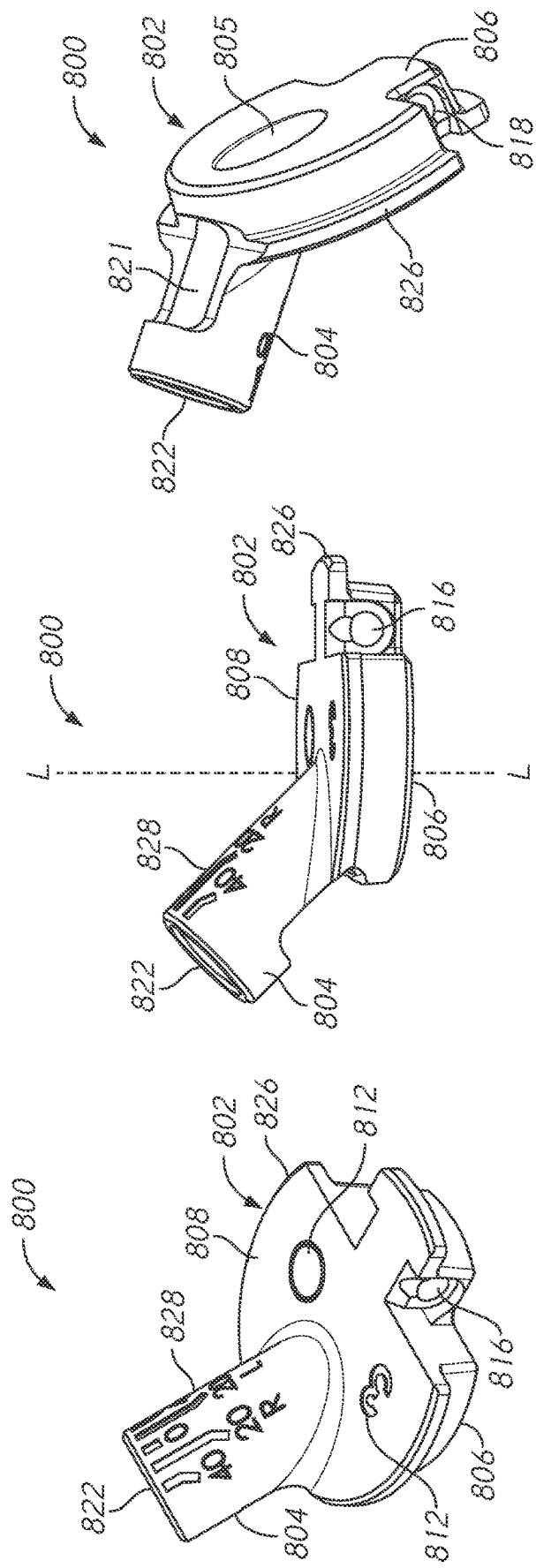

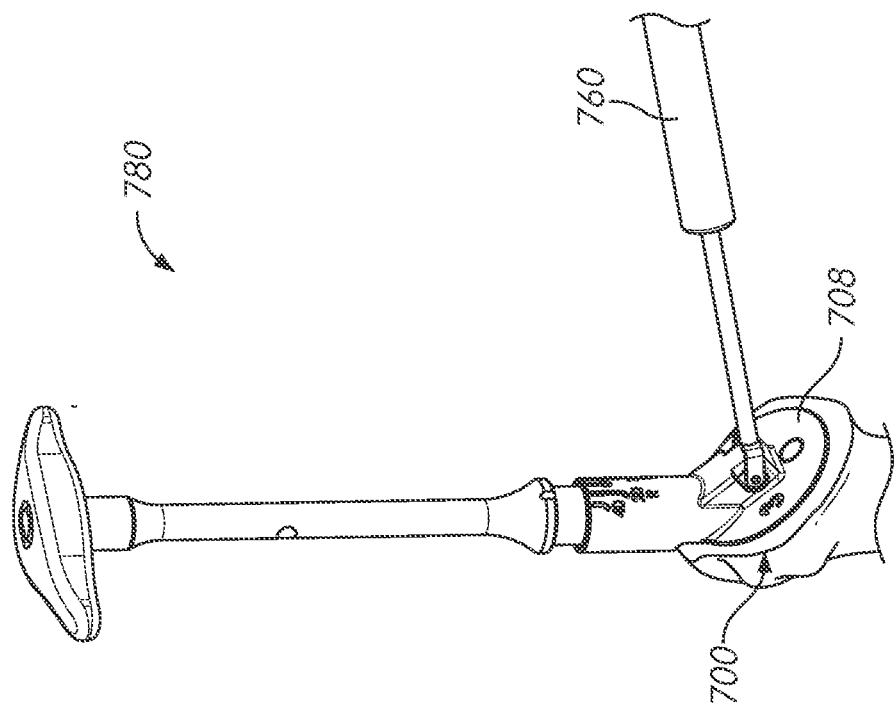
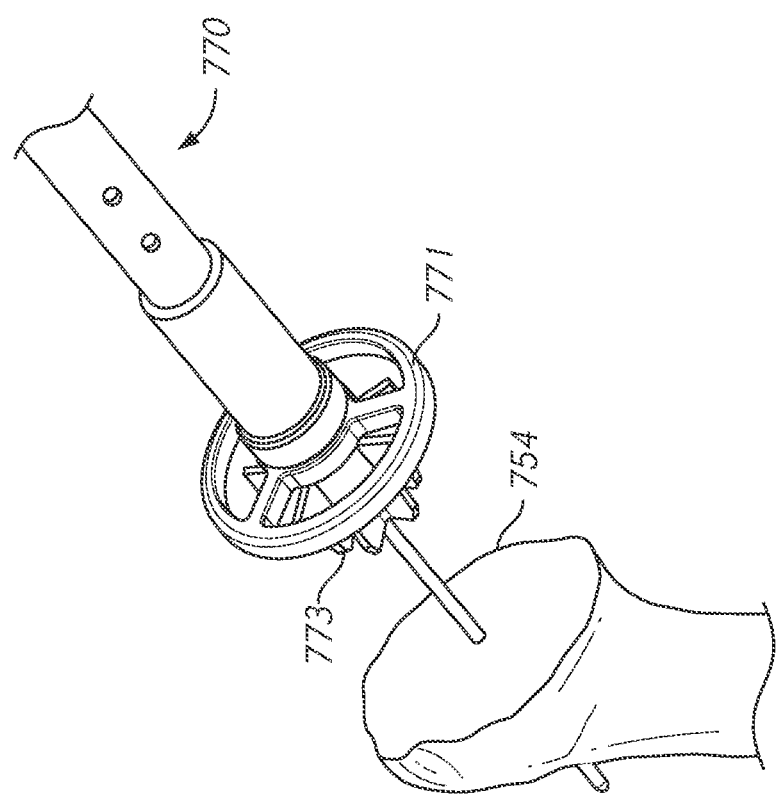
FIG. 16A
FIG. 16B

METAPHYSEAL REFERENCING TECHNIQUE AND INSTRUMENT

RELATED APPLICATION

This application is a National Stage Application, filed under 35 U.S.C 371, of International Patent Application No. PCT/US2019/054024, filed on Oct. 1, 2019, which claims priority to U.S. Provisional Application No. 62/740257, filed on Oct. 2, 2018, the entireties of which are incorporated herein by reference.

BACKGROUND

Field

This application is directed to guides for assisting in the preparation of end portions of long bones as part of a joint replacement or repair procedures, particularly for preparing a proximal (or superior) portion of a humerus for implanting a humeral component of an artificial joint.

Description of the Related Art

Arthroplasty is the standard of care for the treatment of shoulder joint arthritis. A typical humeral head replacement is implanted following exposure of the humeral head, resection of the head and various procedures to create space in the humerus for sub-surface stems or anchors to which an artificial head can be coupled. The humeral head replacement might articulate with the native bone or an opposing glenoid resurfacing device, which may be manufactured from UHMWPE or any other acceptable material.

For more severe cases of shoulder arthritis, the standard treatment is a reverse reconstruction, which includes reversing the kinematics of the shoulder joint. This is performed by securing a semi-spherical device to the glenoid, referred to as a glenoid sphere, and implanting a humeral stem and an articular component coupled to the stem that is capable of receiving the glenoid sphere. In a reverse reconstruction, the humeral stem can attach to a modular tray or include an integrated tray. The tray is configured to receive the articular component.

Preparing the humerus involves resecting the humeral head. Following resection, an awl may be used to create a space distal the resection plane in which the stem or other anchor can be disposed, while a reamer is used to prepare the metaphysis. Historically, reaming is done independently from stem body preparation. However, because there is no link between stem and tray placement, there is the potential for implant misalignment.

SUMMARY

In a diaphyseal referencing technique, a space is first formed in the humerus in the shape of the stem and the metaphyseal or bowl cavity is reamed second. However, due to anatomical offset between the axis of the canal and the center of the humeral head, the bowl or tray may break through a proximal portion of the cortical bone P, which compromises proximal fixation (see FIGS. 1A-1B). In contrast, in a metaphyseal reference technique, the bowl or tray is centered within a resection surface at the proximal end of the humerus and the stem canal is prepared second. However, misalignment between the tray and the stem could lead to distal cortical bone impingement D or distal bone voids V between the canal and the implant, which may compromise stem fixation (see FIGS. 2A-2B).

To solve these issues, the present disclosure is directed toward instruments for evaluating the metaphyseal and diaphyseal axes and techniques for properly implanting a stem and/or tray within a long bone. The instruments include guides that link the position of an implant stem axis to the position of a proximal bowl or tray. For example, the guides can be shaped and/or sized to represent a proximal face and/or a stem inclination angle of different final implant stems. These guides allow the surgeon to evaluate the approximate stem axis position relative to the humeral canal before committing to the bowl placement in the metaphysis. Using these guides, the surgeon can select the appropriate implant and prepare the bone accordingly. This technique transfers the shape of the implant to the bone and ensures proper alignment of the prepared geometry in the bone and the implant geometry. These features also allow the surgeon to visualize the resection angle relative to the humeral canal to help avoid varus or valgus implant alignment.

The instrumentation can include a system for sizing the resected surface to provide metaphyseal referencing and to properly guide a tool into a central portion of the canal in the diaphysis. The system can include a sizing feature to approximate the size of the metaphysis. The system can also include a base configured to contact the metaphysis and a guide feature configured to guide a tool along a central portion of the canal in the diaphysis. The sizing feature can be a separate disk component or integral with the base.

The instrumentation can include a guide having a base configured to provide metaphyseal referencing. The base can include a first surface configured to contact the metaphysis (pre- or post-reaming) and a second surface opposite the first surface. The guide can include a guide feature having a central axis disposed to guide a tool, for example an awl or a sounder, into a diaphysis of the bone along a central portion of a canal in the diaphysis. The guide feature can extend into and/or outward of the base.

The guide can form part of a kit including multiple guides. Each guide can be configured to position the tool at a different angle relative to the face of the resection surface and/or the metaphyseal axis. A sizing feature can be included in the kit as a separate disk or integrated into the base of one or more of the humeral guides. The sizing feature can help approximate a size of the metaphysis.

Preparing the long bone can include sizing a proximal portion of the bone to properly center and seat the tray within the metaphysis. A central guide pin may be positioned in the bone to center other instruments. Based on the appropriate sizing, a suitable guide may be selected. After sizing, the metaphysis is prepared using a reamer, and the selected guide can guide a tool down a central portion of the canal. The reaming step can take place prior to beginning canal preparation or after canal preparation begins.

Any feature, structure, or step disclosed herein can be replaced with or combined with any other feature, structure, or step disclosed herein, or omitted. Further, for purposes of summarizing the disclosure, certain aspects, advantages, and features of the inventions have been described herein. It is to be understood that not necessarily any or all such advantages are achieved in accordance with any particular embodiment of the inventions disclosed herein. No individual aspects of this disclosure are essential or indispensable.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

FIGS. 13A-13C illustrate another humeral guide.

FIGS. 15A-15C illustrate another humeral guide.

FIGS. 16A-16B illustrate steps for bone preparation using the humeral guide shown in FIG. 13A.

DETAILED DESCRIPTION

The instrumentation and techniques described herein provide a link between the position of the implant stem axis and the position of the proximal bowl/tray to avoid the above-described complications associated with independent diaphysis and metaphysis preparation. The instrumentation allows the surgeon to evaluate the metaphysis and diaphysis and prepare the bone according to the shape of the implant. The instrumentation also provides opportunities to modify the version, if necessary. Although certain instruments and techniques have been described herein in connection with a humeral bone, the instrumentation and techniques described herein can be used with other long bones, including the femur.

Figure 3C:
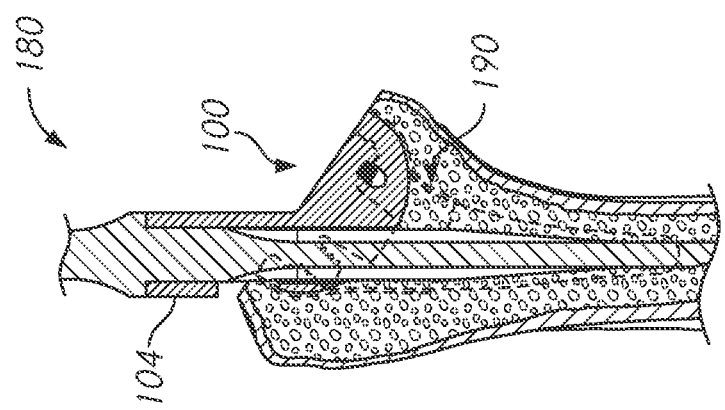
FIGS. 3A-3C illustrate the use of an example of a humeral guide providing a link between the diaphysis axis and the metaphysis axis of the humerus bone.
Figure 3B:
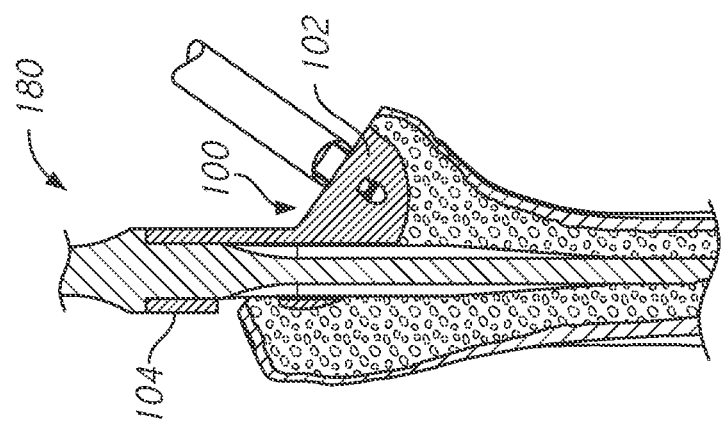
Figure 3A:
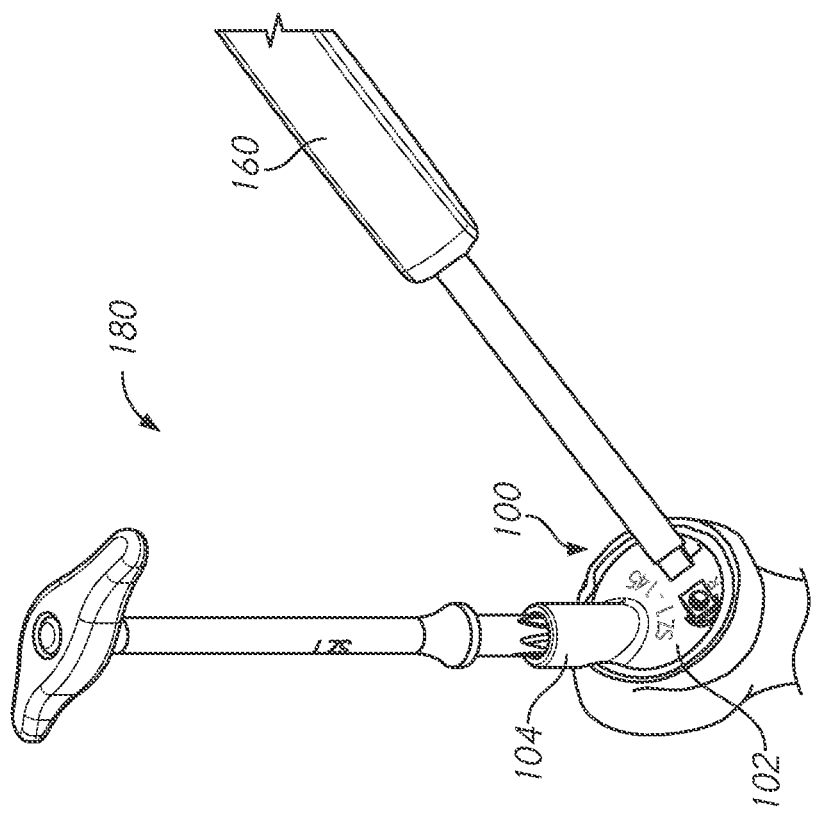

FIGS. 3A and 3B illustrate a humeral guide 100 positioned in a reamed cavity of a metaphysis of a humerus. The base 102 of the humeral guide 100 is centered in the reamed cavity and provides metaphyseal referencing. As shown in FIG. 3B, the humeral guide 100 includes a guide feature 104 to guide the starter awl 180 toward or into a central portion of the canal. FIG. 3C illustrates the relative positions between the starter awl 180 and the final implant 190. As shown, the stem axis of the final implant 190 is aligned with the axis of the starter awl 180, while the implant tray is centered in the reamed cavity. Although this and other humeral guides herein are described in connection with a starter awl, the humeral guides can guide any tool, including different sized awls, sounders, broaches, punches, or other tools.

Figure 4B:
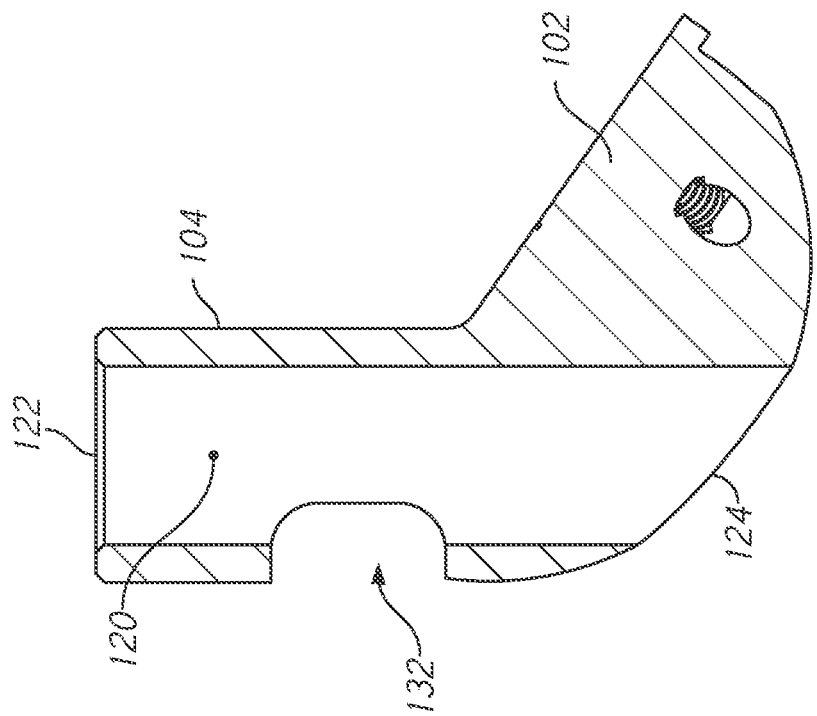
FIGS. 4A and 4B illustrate the humeral guide shown in FIGS. 3A-3C, separate from the humerus bone.
Figure 4A:
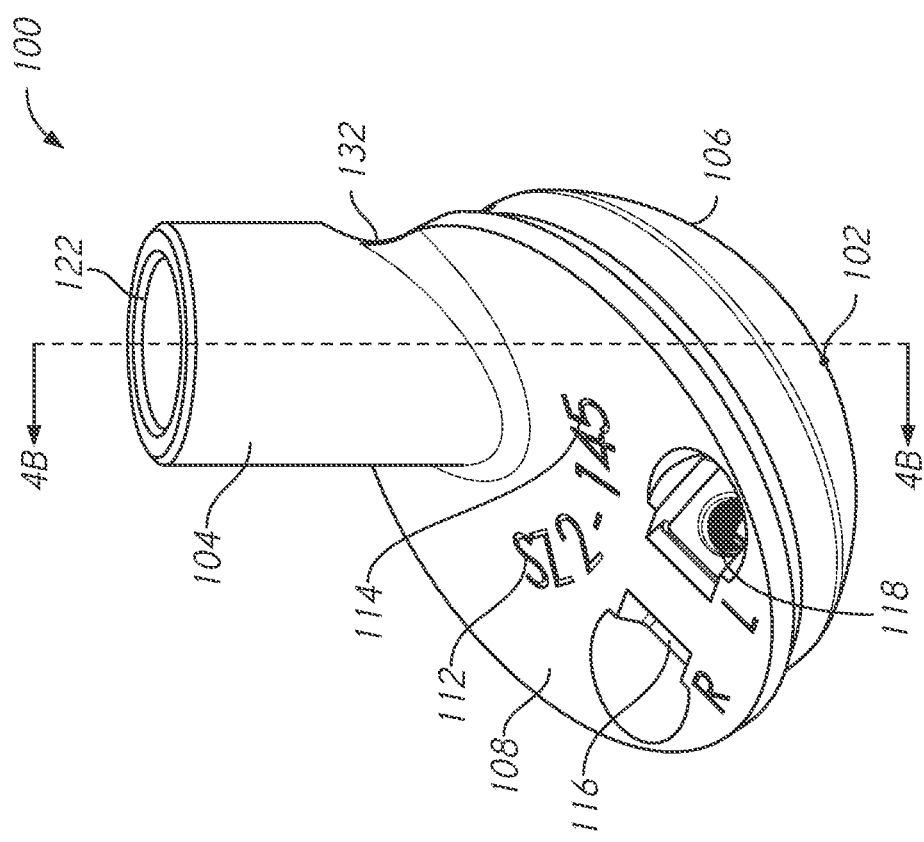

FIG. 4A illustrates the humeral guide 100 shown in FIG. 3A. As discussed above, the humeral guide 100 includes a base 102 and a guide feature 104. The base 102 includes a first or lateral surface 106 configured to contact the metaphysis and a second or medial surface 108 opposite the first surface 106.

The base 102 is configured to be centered within an outer periphery of the metaphysis so that the final implant does not break through a proximal portion of the cortical bone. For example, as shown in FIG. 3B, the curved profile of the first surface 106 enables the base 102 to be positioned within a reamed cavity in the metaphysis. Although, as shown in later examples, the first surface 106 can take on any profile, including planar, conical, cylindrical, or otherwise, depending on how the metaphysis is prepared.

The humeral guide 100 can include an indicator, for example text, color, surface modifications, etc., e.g., a size indicator 112 of a particular size and/or inclination angle indicator 114 of a particular angle of the humeral guide 100. As detailed further below, the humeral guide 100 can form part of a kit including a plurality of humeral guides 100. The humeral guides 100 may vary in size, e.g., diameter, as indicated by the size indicator 112. The size of the humeral guide 100 can mimic the size of the final implant, for example a proximal face of the final implant stem.

The humeral guides 100 may provide different inclination angles between the guide feature 104 and the base 102 as indicated by the inclination angle indicator 114. The inclination angle of the humeral guide 100 can represent a stem inclination angle of the final implant. The humeral stem is usually offered in one fixed inclination angle, e.g., between 125 degrees and 155 degrees. The humeral stem can be configured with a fixed 135 degree inclination angle. The humeral stem can be configured with a fixed 145 degree inclination angle.

The surgeon may prefer to use a handle 160 to position the humeral guide 100 on the anatomy. Accordingly, the second surface 108 can optionally include one or more handle attachment features 116, 118 configured to interface with a modular handle 160 (see FIG. 3A). As shown in FIG. 4A, the humeral guide 100 can include a right handle attachment feature 116 and/or a left handle attachment feature 118, depending on which arm is being prepared, preferences of the surgeon, and/or attachment interface on the handle 160. For example, the right handle attachment feature 116 is accessible through an anterior incision accessing the right arm, while the left handle attachment feature 118 is accessible through an anterior incision accessing the left arm. The handle attachment features 116, 118 can be positioned at an inferior region of the humeral guide 100. For example, each handle attachment feature 116, 118 can be an angled opening on a second surface 108 of the humeral guide 100. Other possible configurations are shown in later examples.

The humeral guide 100 can include a guide feature 104 on or accessible from the second surface 108. As shown in FIG. 4B, the guide feature 104 defines a lumen 120 extending from a proximal opening 122 of the guide feature 104 to a distal opening 124 of the base 102 such that a tool can be advanced through the humeral guide 100. The guide feature 104 is configured to guide a tool into a diaphysis of the humerus bone along a central portion of a canal in the diaphysis. The guide feature 104 can be positioned at a superior side or region of the base 102 so the guide feature 104 can guide a tool into the diaphysis. In this context, superior includes a side of the guide that would be opposite to an inferior portion of the humerus regardless of the orientation of the patient in surgery.

Although not required, the guide feature 104 can extend outwardly from a surface of the base 102 to provide additional stabilization and support for the tool. For example, as shown in FIG. 4A, the guide feature 104 extends away from the second surface 108. The guide feature 104 can have a cylindrical profile. In other configurations, the proximal opening 122 of the guide feature may be positioned at or flush with the second surface 108.

The guide feature 104 can include a relief 132 at a transition between the guide feature 104 and the base 102 to facilitate manufacturing or surgical use. For example, in certain surgical techniques the relief 132 also allows the base 102 to fully sit within the reamed cavity so the guide feature 104 does not obstruct proper positioning of the base 102 (see FIG. 3B).

Figure 5:
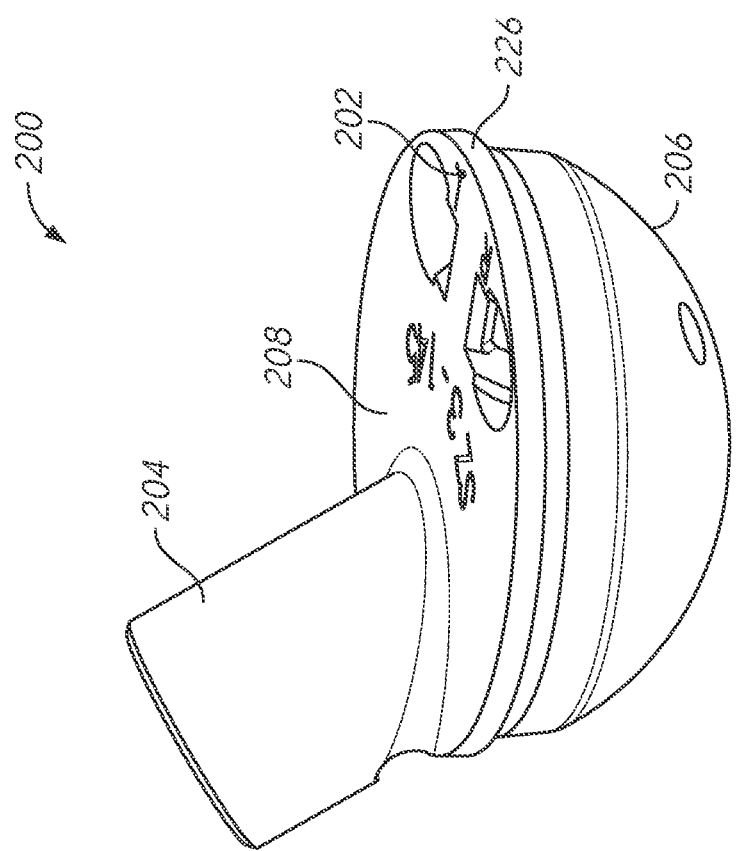
FIG. 5 illustrates another humeral guide including a depth stop collar.

FIG. 5 illustrates another humeral guide 200 that can include any of the features described above with respect to FIGS. 4A and 4B. The humeral guide 200 includes a depth stop 226 configured to control a depth of the humeral guide 200 relative to the bone. In use, the depth stop 226 rests on the resection surface. For example, in certain techniques the humerus is resected, creating a generally planar resection surface. The bone at the resection surface can be altered with a reamer to create a space for the guide 200. The guide can be inserted into the reamed space until the depth stop 226 rests on the resection surface of the humerus around the reamed area. These and related methods are elaborated below. As shown, the depth stop 226 includes a collar that extends transversely, e.g., radially outwardly, from the first surface 206. However, as described in later examples, the depth stop 226 can be a modular component separately attached to a guide that may be otherwise similar to the humeral guide 200.

Figure 6:
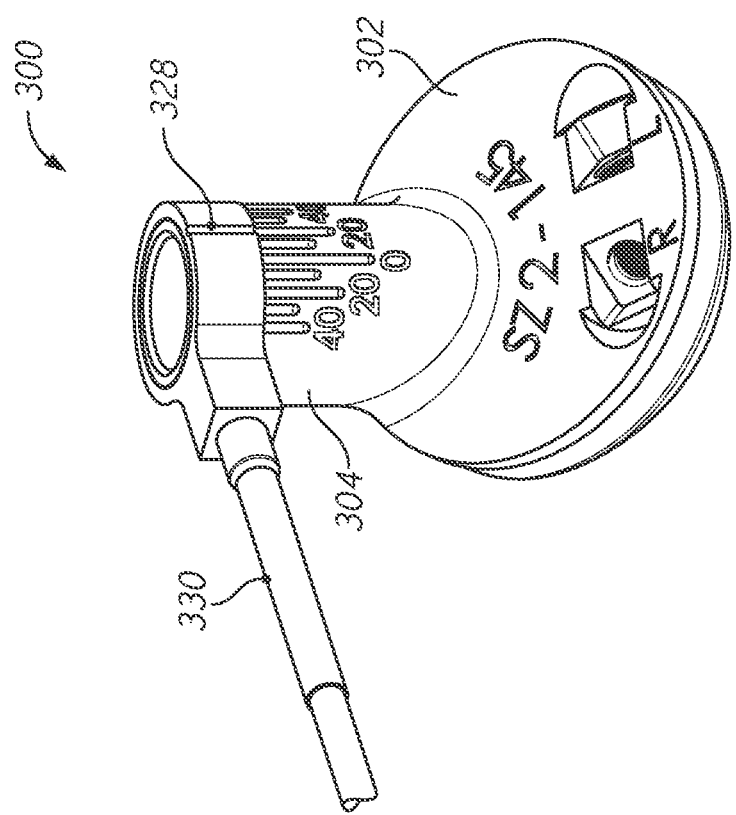
FIG. 6 illustrates another humeral guide including a retroversion indicator.

FIG. 6 illustrates another embodiment of a humeral guide 300 that can include any of the features described above with respect to FIGS. 4A, 4B, and 5. The humeral guide 300 includes a retroversion indicator 328. The humeral guide 300 also includes a retroversion rod 330 to allow the surgeon to evaluate the version. The retroversion rod 330 can be moveable relative to the cylindrical body of the guide feature 304. For example, the retroversion rod 330 can be configured to swivel with respect to the retroversion indicator 328. If the proximal humeral resection was not accurate or for other reasons dictated by surgeon judgement, the surgeon can modify the version by forcing the guide 300 to an appropriate version angle. This technique can also be used to fine tune stem access as controlled by the guide 300 as discussed in greater detail below.

Figure 7A:
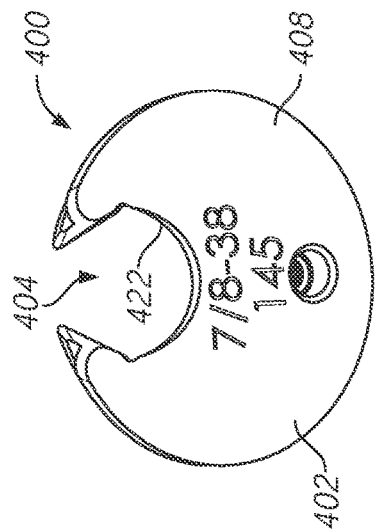
FIGS. 7A-7D illustrate another humeral guide adapted to receive a sounder.
Figure 7B:
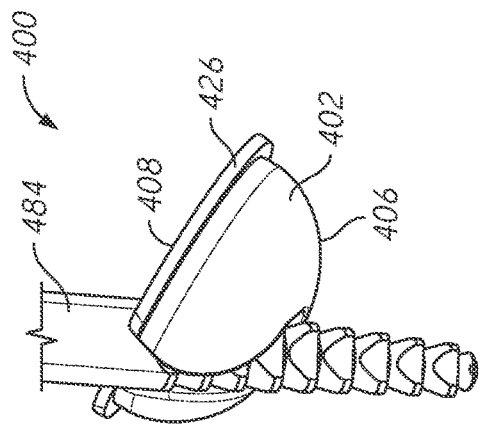
Figure 7C:
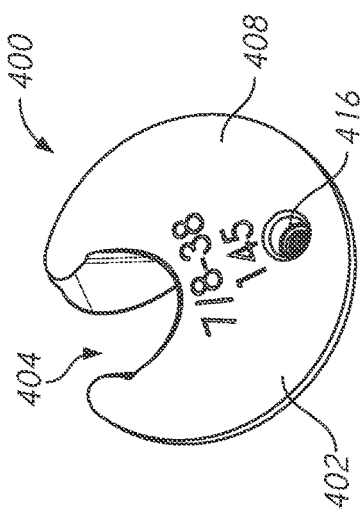
Figure 7D:
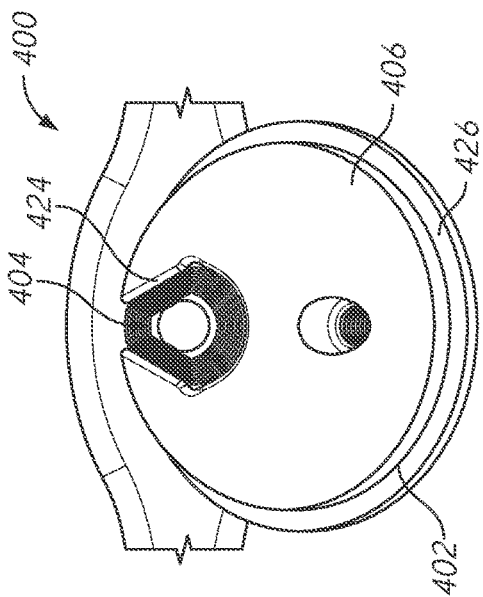

FIGS. 7A-7D illustrate another embodiment of a humeral guide 400 that can include any of the features described above with respect to FIGS. 4A, 4B, 5, and 6. As shown in FIGS. 7C and 7D, the humeral guide 400 can include a base 402 with a first surface 406 and a second surface 408. The second surface 408 can include a depth stop collar 426 extending radially outward beyond the first surface 406. The depth stop collar 426 is configured to rest on the resection surface and control a depth of the humeral guide 400.

The humeral guide 400 can include a guide feature 404 adapted to receive a sounder 484 (see FIG. 7D) or other bone preparation instrument. The guide feature 404 can extend from a proximal opening 422 at the second surface 408 to a distal opening 424 at the first surface 406. The sounder 484 can include a transverse non-circular profile to mimic the shape of the final implant stem. The sounder 484 may be a starter sounder and progressively larger sounders may be used thereafter to enlarge the opening.

The profile of the guide feature 404, for example at the proximal opening 422 and/or at the distal opening 424, can be non-circular and/or shaped to match the sounder 484 or other tool to prevent rotation of the sounder 484. For example, the periphery of the proximal opening 422 can have at least one non-circular portion, e.g., an inflection point where a circular arc joins a linear segment or joins an arcuate section with a different radius of curvature. A portion of the periphery of the proximal opening 422 can be open such that a portion of the sounder or other instrument can be disposed inside the opening 422 and a portion can extend through the side of the periphery out of the opening 422.

The surgeon may prefer to use a handle to position the humeral guide 400 on the anatomy. Accordingly, the second surface 08 can optionally include one or more handle attachment features 416 configured to interface with a modular handle.

Figure 8B:
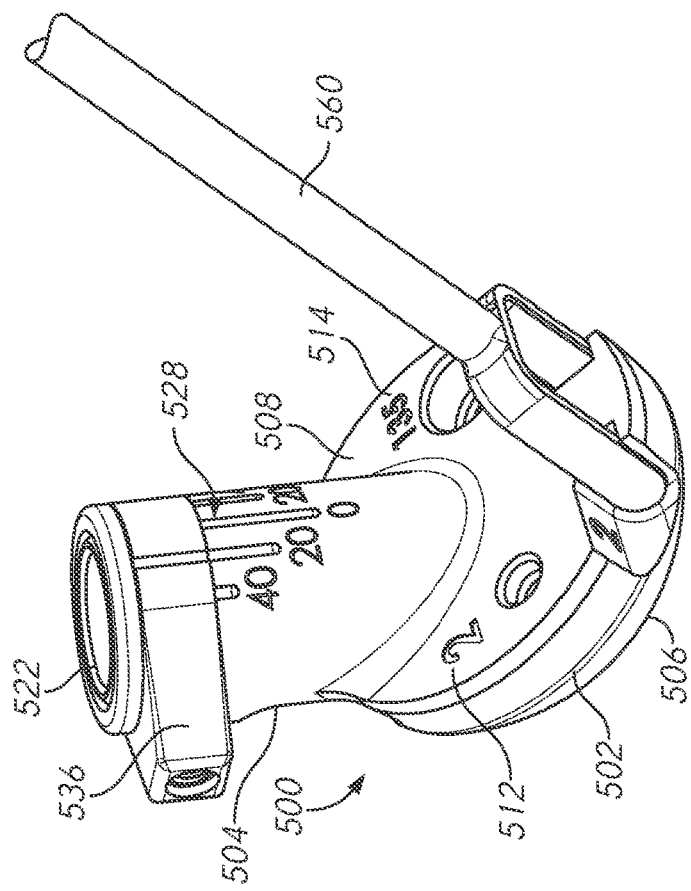
FIGS. 8A-8E illustrate another humeral guide and components thereof.
Figure 8A:
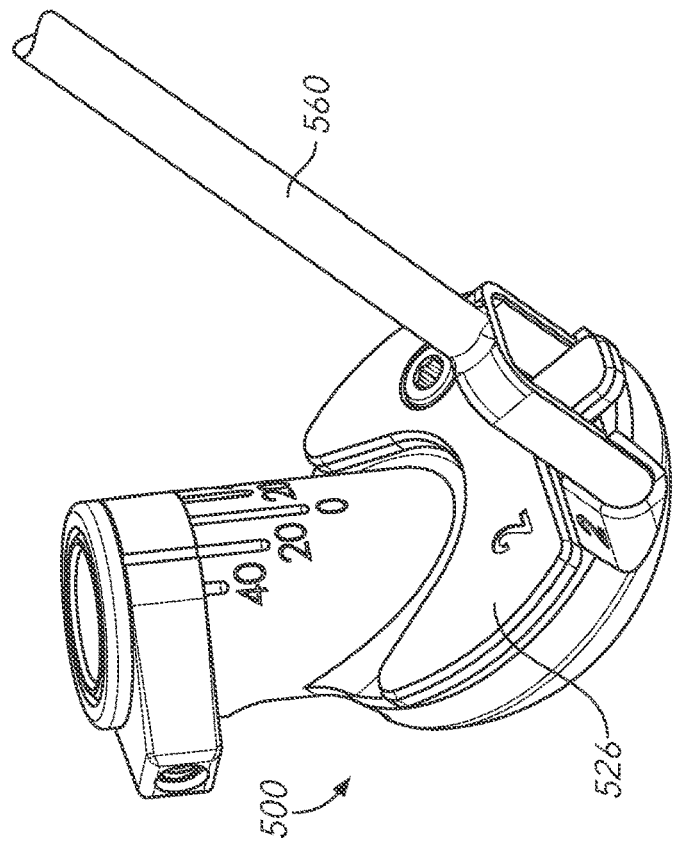
Figure 8D:
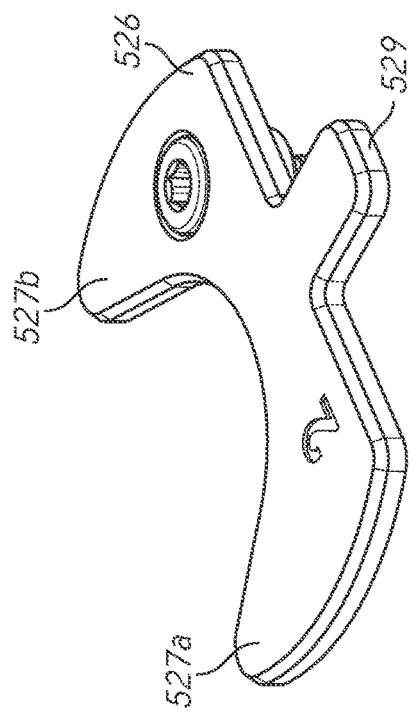
Figure 8E:
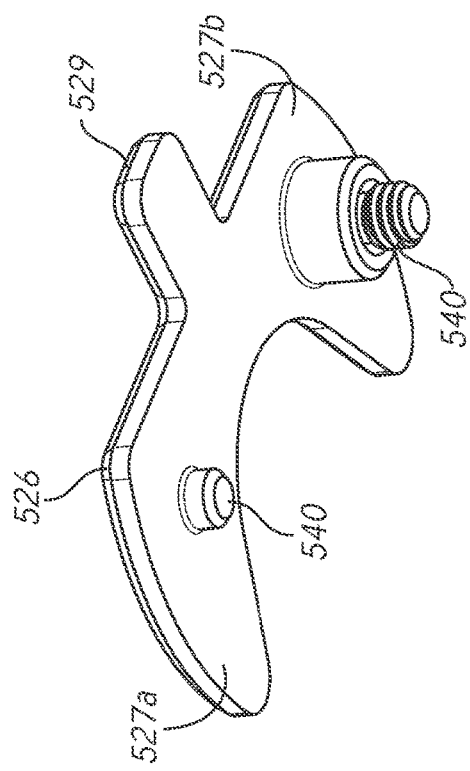
Figure 8C:
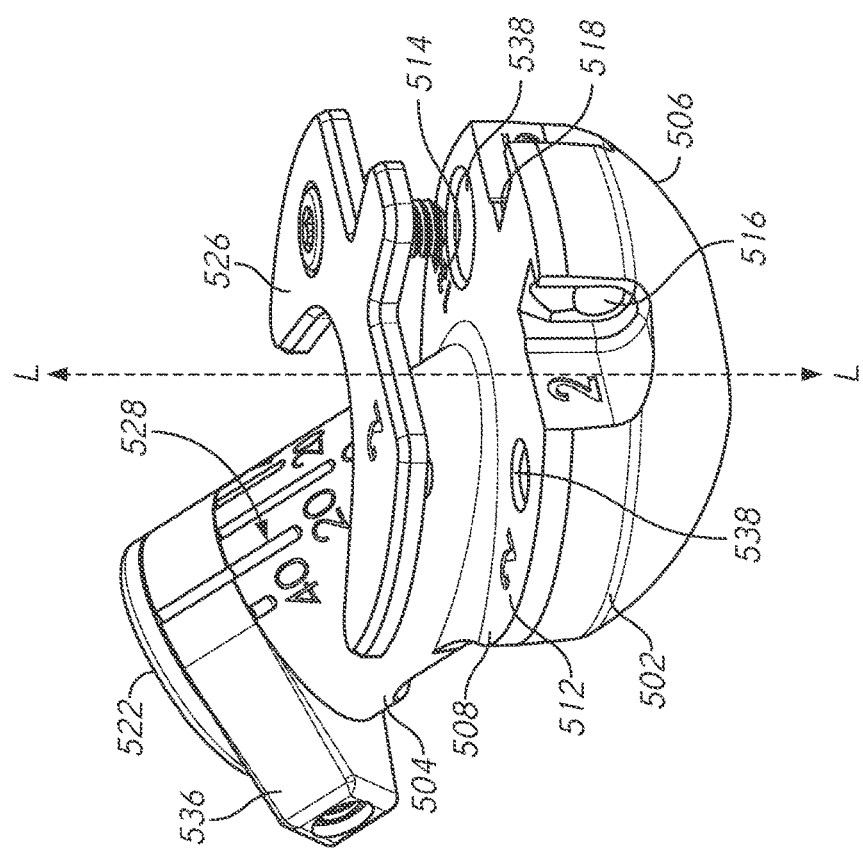

FIGS. 8A-8E illustrate another humeral guide 500 and various components thereof. The humeral guide 500 can include any of the features discussed above with respect to humeral guides 100, 200, 300, and 400. FIG. 8A illustrates the humeral guide 500 configured as an assembly with a modular depth stop 526 and a modular handle 560 attached to a base 502. FIG. 8B illustrates the humeral guide 500 without the modular depth stop 526. FIG. 8C illustrates a partial exploded view of the humeral guide 500 and the modular depth stop 526.

As shown in FIGS. 8B and 8C, the humeral guide 500 includes the base 502 and a guide feature 504. The base 502 includes a first or lateral surface 506 configured to contact the metaphysis and a second or medial surface 508 opposite the first surface 506.

The base 502 is configured to be centered within an outer periphery of the metaphysis so that the final implant which is later to be disposed in the same position as the base 502 does not break through a proximal portion of the cortical bone. As shown, the first surface 506 has a curved profile that enables the base 502 to be positioned within a reamed cavity in the metaphysis. However, the first surface 506 can take on any profile, including planar, conical, cylindrical, or otherwise, depending on how the metaphysis is prepared.

The second surface 508 can include an indicator, for example text, color, surface modifications, etc., e.g., a size indicator 512 of a particular size and/or inclination angle indicator 514 of a particular angle of the humeral guide 500. The size of the humeral guide 500 can mimic the size of the final implant, for example a proximal face of the final implant stem. The inclination angle can represent a stem inclination angle of the final implant. The humeral stem is usually offered in one fixed inclination angle, e.g., between 125 degrees and 155 degrees. The humeral stem can be configured with a fixed 135 degree inclination angle. The humeral stem can be configured with a fixed 145 degree inclination angle.

The surgeon may prefer to use a handle 560 to position the humeral guide 500 on the anatomy. Accordingly, as shown in the FIG. 8C, the humeral guide 500 can optionally include one or more handle attachment features 516, 518 configured to interface with a modular handle 560. The handle attachment features 516, 518 can be positioned at an inferior region of the humeral guide 500. For example, each handle attachment feature 516, 518 can be an opening extending in a transverse direction or perpendicular to a longitudinal axis L of the humeral guide 500. The handle attachment features 516, 518 can be disposed on a portion of the base 502 opposite to the guide feature 504.

The guide feature 504 of the guide 500 can be disposed on or accessible from the second surface 508. The guide feature 504 defines a lumen extending from a proximal opening 522 of the guide feature 504 to a distal opening of the base 502 such that a tool can be advanced through the humeral guide 500. The guide feature 504 is configured to guide a tool into a diaphysis of the humerus bone along a central portion of a canal in the diaphysis. The guide feature 504 can be positioned at a superior side or region of the base 502 so the guide feature 504 can guide a tool into the diaphysis.

The guide feature 504 can extend proximally from a surface of the base 502 such that the proximal opening 522 is disposed away from (proximal of) the second surface 508 to provide additional stabilization and support for the tool. The guide feature 504 can have a cylindrical profile. The guide feature 504 does not extend proximally in some embodiments.

The guide feature 504 can include a retroversion indicator 528. The humeral guide 500 also can include or be coupled with a retroversion rod to allow the surgeon to evaluate the version. Although the retroversion rod is not shown, the guide feature 504 can include a connector 536 adapted to receive the retroversion rod. The retroversion rod and connector 536 can be moveable relative to the cylindrical body of the guide feature 504. For example, the retroversion rod and connector 536 can be configured to swivel with respect to the retroversion indicator 528. If the proximal humeral resection was not accurate or for other reasons dictated by surgeon judgement, the surgeon can modify the version by forcing the guide 500 to an appropriate version angle. This technique can also be used to fine tune stem access as controlled by the guide 500.

As shown in FIG. 8C, the humeral guide 500 can include a modular stop collar 526 configured to abut or be joined or coupled to the second surface 508 of the base 502. The stop collar 526 can be shaped according to the profile of the second surface 508. For example, the stop collar 526 may at least partially surround a periphery of the guide 500 at or proximal of the second surface 508 and can at least partially surround the guide feature 504 and/or handle attachment features 516, 518 in some embodiments. The stop collar 526 is configured to control a depth of the humeral guide 500 relative to the bone. In use, the stop collar 526 rests on the resection surface defining the position and location of the guide 500 relative to the resection surface. The stop collar 526 has three discrete areas of contact in one embodiment. First and second arcuate segments 527a, 527b are provided on opposite sides of the collar 526. A projection 529 of the stop collar 526 disposed between the segments 527a, 527b provides contact at a third position. The modular stop collar 526 may be advantageous if the surgeon plans to change the version using the retroversion rod.

The base 502 can include one or more interfacing features 538 adapted to align with and/or join one or more corresponding interfacing features 540 on the stop collar 526. For example, the base interfacing features 538 can include one or more openings on the second surface 508 of the base 502 and the stop collar interfacing features 540 can include one or more projections on an underside of the stop collar 526, or vice versa. Each interfacing feature 538, 540 can be integral with or separate with the base 502 or stop collar 526. Any of the interfacing features 538, 540 can be threaded or include other interlocking features to join the base 502. Any of the interfacing features 538, 540 may not include an interlocking feature and simply provide alignment. As shown in FIG. 8E, the stop collar 526 can include an integral projection with a smooth outer surface and a separate threaded connector for joining the base 502.

Figure 9C:
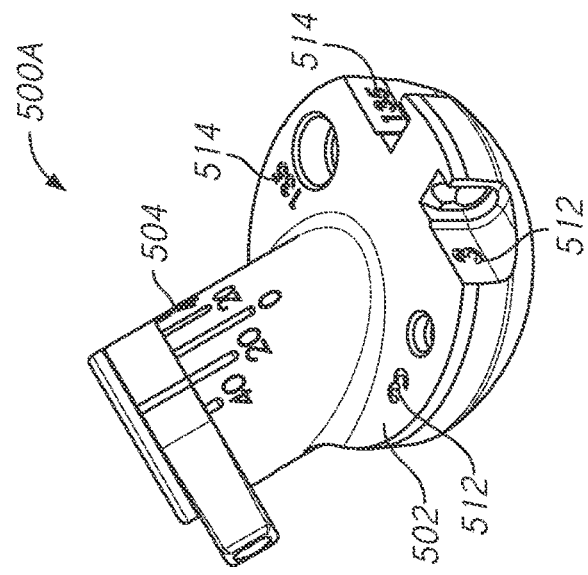
FIGS. 9A-9C illustrate a kit including the humeral guide shown in FIGS. 8A-8E.
Figure 9B:
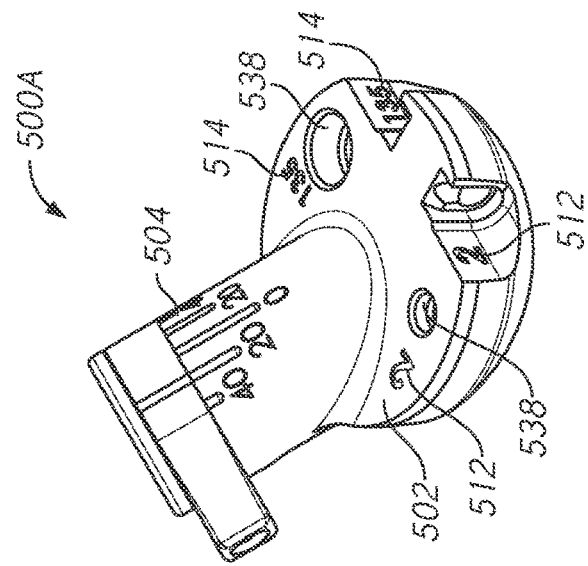
Figure 9A:
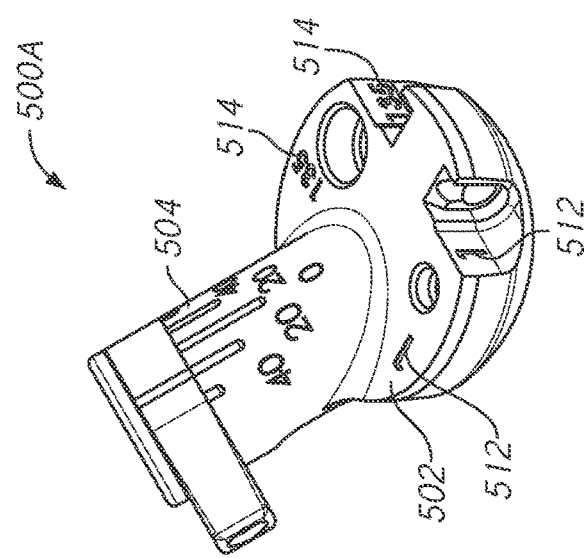

As shown in FIGS. 9A-9C, the humeral guide 500 can form part of a kit including a plurality of humeral guides 500A, 500B, 500C. The humeral guides 500 may vary in size as indicated by the size indicator(s) 512 and/or provide different inclination angles between the guide feature 504 and the base 502 as indicated by the inclination angle indicator(s) 514.

FIGS. 10A-10K illustrate methods of implanting a final implant using the humeral guide 100. These methods can utilize the humeral guides 200, 300, 400, 500 or other humeral guides discussed or covered by the claims herein.

After the surgeon gains access to the humeral head, the superior or proximal end portion of the humerus is resected. The surgeon may be provided with one or more sizing disks 150 to determine a size of the metaphysis, for example, two, three, four, or more different sized disks. For example, each sizing disk 150 can include an arcuate body, e.g., a circular body 166, representative of the diameter of a proximal face of a stem of the final implant 190. The diameter of the circular body 166 may vary between the different sized disks 150. Each sizing disk 150 can include a sizing indicator 112 representative of the size of the sizing disk 150. As described in more detail below, the selected sizing disk 150 can indicate the size of at least some of the tools and/or implants the surgeon should use to prepare the bone.

Figure 10B:
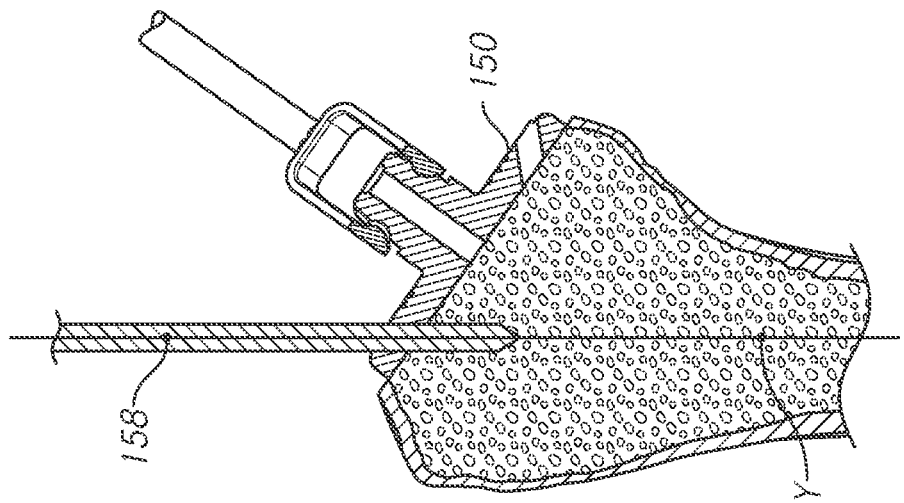
FIGS. 10A-10K illustrate a technique for positioning an implant using the humeral guides shown in at least FIGS. 4A-4B.
Figure 10A:
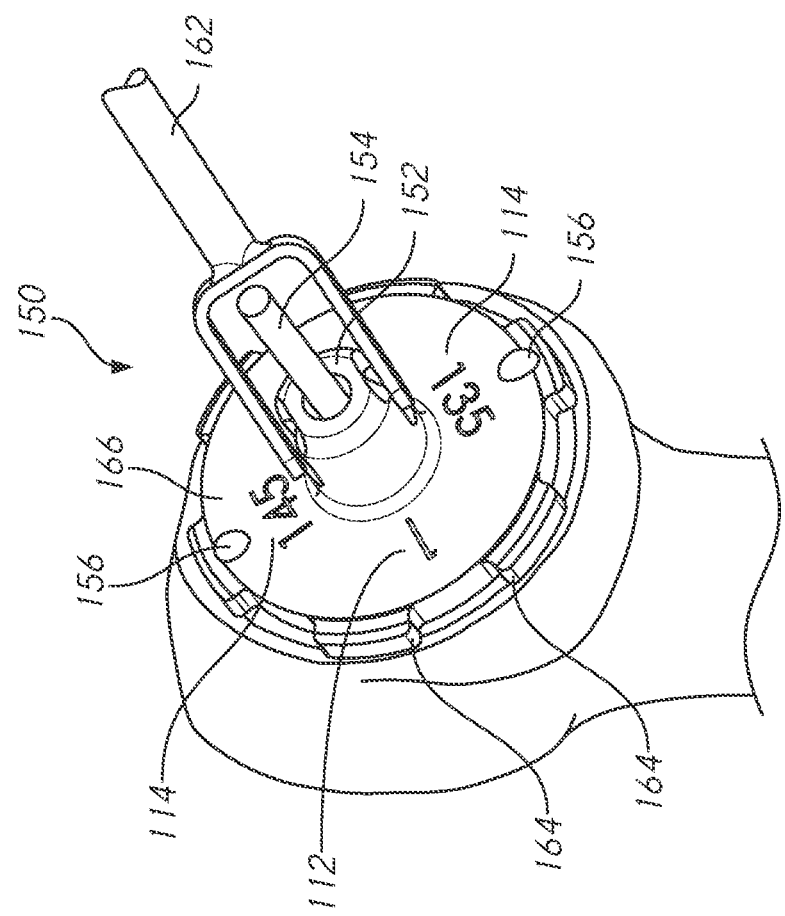

As shown in FIG. 10A, the sizing disks 150 may include one or more tabs 164 or other sizing features extending transversely, e.g., radially outward from the circular body 166. The tabs 164 facilitate visualization of the space between the implant to be implanted (visualized with reference to the circular body 166) and the cortical boundary of the bone. If the outer periphery of the sizing disk 150 hangs over the inner cortical boundary, then the surgeon should select a different sized, e.g., a smaller, sizing disk 150. The thickness of the tabs 164 measured from the circular body 166 to the outer periphery of the tabs 164 can change between the different sizing disks 150.

Optionally, each sizing disk 150 can be positioned using a modular handle 162. The surgeon will select the appropriate sized disk 150 that centers a cannulation hole 152 at the center of the resection surface and fits within the cortical boundary of the resected surface, but does not hang over the periphery of the resected surface (see FIG. 10A). The cannulation hole 152 is configured to receive a central guide pin 154 that subsequently is used to center other humeral preparation instruments.

The sizing disk 150 can also include a plurality of inclination holes 156, for example two, three, four, or more holes, providing a different inclination angle relative to the face of the resection surface. The angle of the inclination holes 156 can be representative of a resection angle or a stem inclination angle, e.g., between an axis extending through a distal end of the stem and an axis extending through a proximal face of the stem, of the final implant. The inclination angle can represent the angle between the metaphyseal bowl and the stem to allow the surgeon to evaluate approximate stem axis position relative to the humeral canal before committing to the bowl placement in the metaphysis.

Each inclination hole 156 can be provided with an inclination indicator 114 that indicates the inclination angle of each inclination hole 156. For example, in FIG. 10A, the inclination hole 156 identified as "145" represents a 145 degree angle relative to the face of the resection surface. The inclination hole 156 identified as "135" represents a 135 degree angle relative to the face of the resection surface. The surgeon can rotate the sizing disk 150 to select the appropriate inclination angle.

Figure 1B:
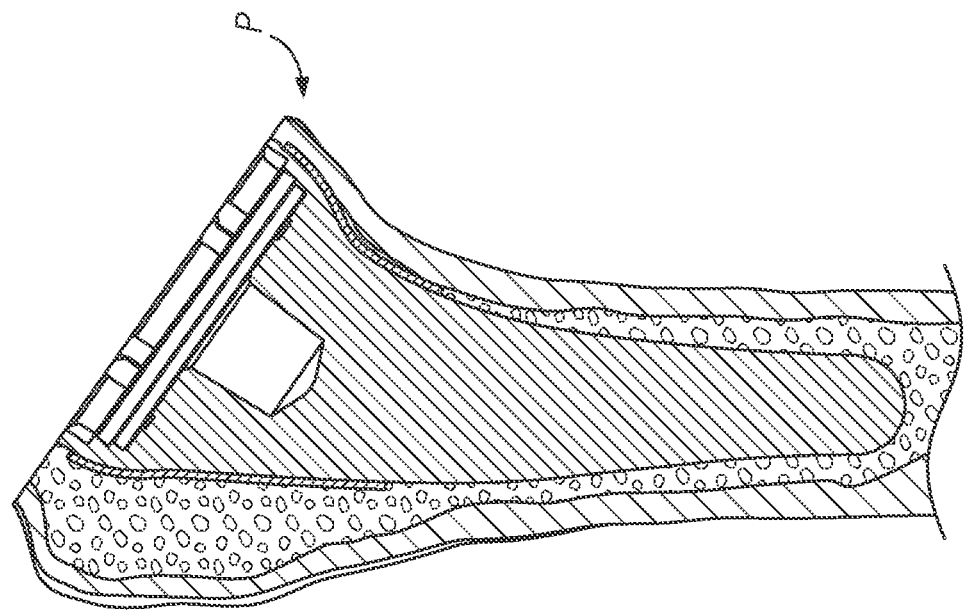
FIGS. 1A-1B illustrate complications from a diaphyseal referencing technique.
Figure 1A:
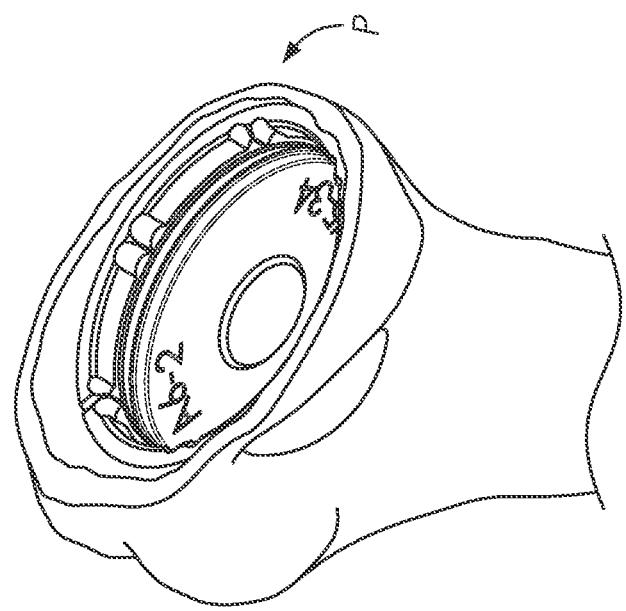
Figure 2B:
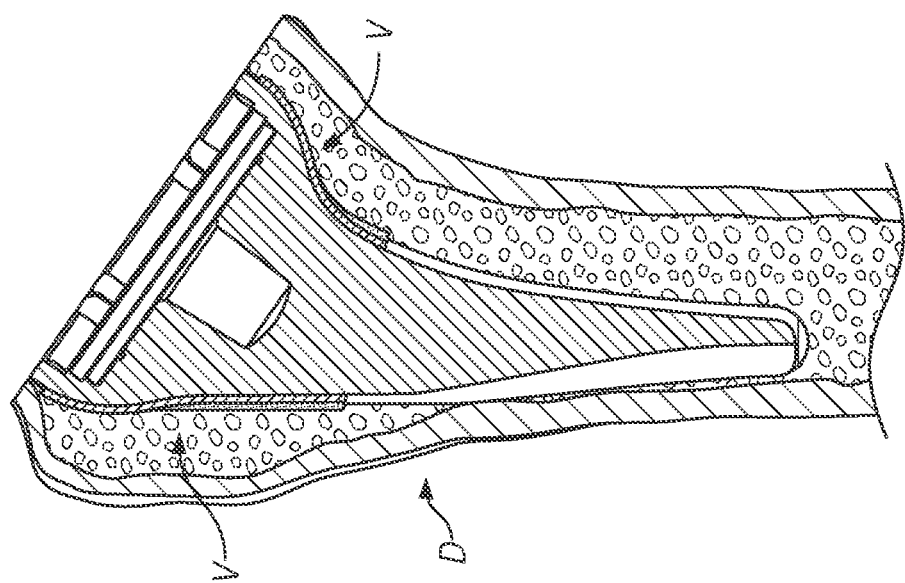
FIGS. 2A-2B illustrate complications from a metaphyseal referencing technique.
Figure 2A:
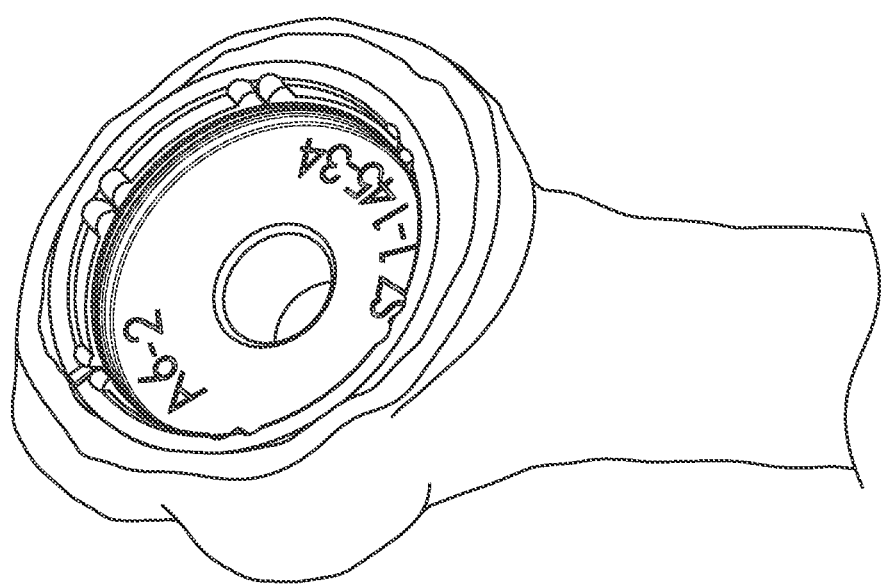

As shown in FIG. 10B, the surgeon can place a pin 158, for example a drill pin, through one of the inclination holes 156 to visualize the location of the pin relative to the diaphysis axis Y. If the pin is displaced from the diaphysis axis Y, for example, superior or lateral to the diaphysis axis Y, the surgeon may select a different sized disk 150 to move the pin 158 closer to the diaphysis axis Y. If the pin 158 and the diaphysis axis Y are misaligned, there is a risk of distal cortical bone impingement (see FIG. 2E). The pin 158 can be placed prior to or after positioning the central guide pin 154. Alternative to the pin, a structure, such as a retroversion indicator, may be integrated with and/or extend from the sizing disk 150 to provide a visual marker.

The sizing disk 150 can also help verify that the angle of the resected surface is appropriate. If the pin 158 is not in line with or parallel the diaphysis axis Y, then the angle of the resected surface may be off and the surgeon can recut the resected surface or make another adjustment to improve the positioning in the humerus.

Figure 10D:
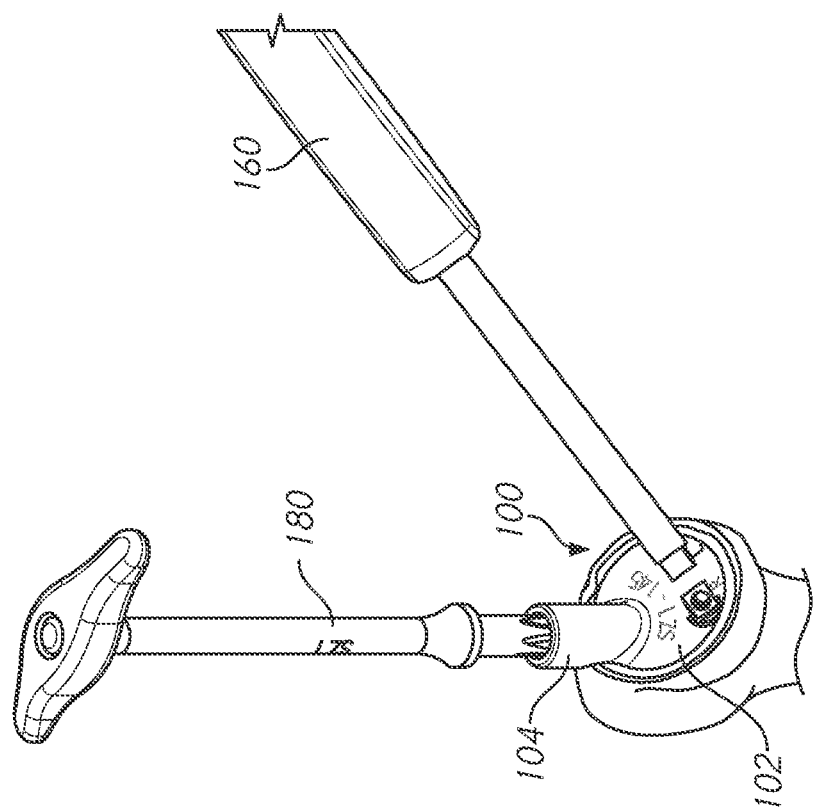
Figure 10C:
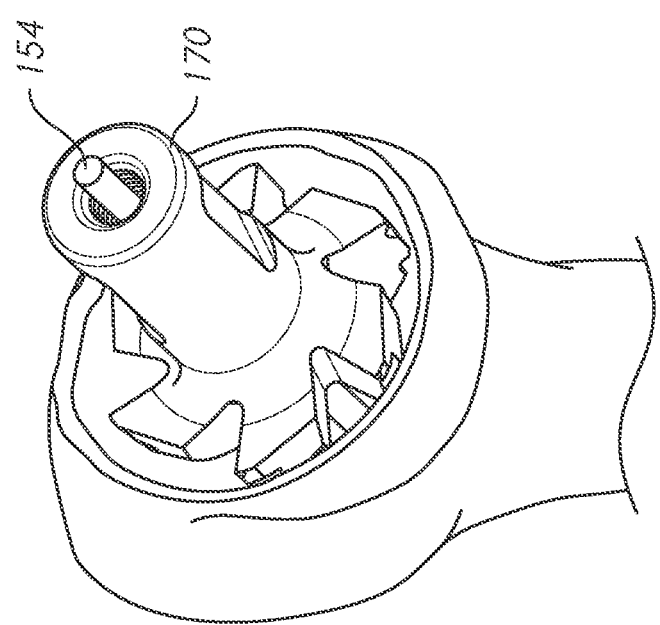
Figure 10G:
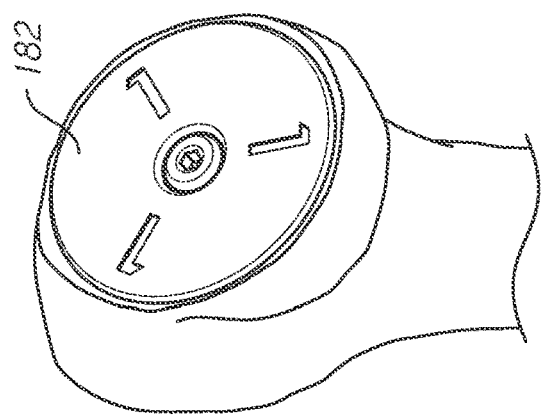

After selecting the appropriate sizing disk 150, a corresponding sized reamer 170 may be selected and delivered over the central guide pin 154 to ream the metaphysis (see FIG. 10C). The reamer 170 produces a generally concave surface in the resected humerus. The surface can generally match the curvature of the first or lateral surface 106, though being an inverse thereof.

After reaming, the first surface 106 of any of the above-described humeral guides may be positioned in the reamed cavity. A humeral guide 100 is selected based on the selected sizing disk 150 and/or selected inclination angle. The diameter of the base 102 corresponds to the diameter of the circular body 166 of the selected sizing disk 150. The orientation of the guide feature 104 corresponds to the selected inclination angle.

The humeral guide 100 may be positioned in the metaphysis using a modular handle 160. As previously discussed with respect to FIG. 3B, the base 102 should be fully seated within the reamed cavity to provide metaphyseal referencing. The relief 132 allows the base 102 to fully sit within the reamed cavity. For example, the transition from the concave reamed surface to the generally planar resection surface of the humerus can be partly received in the relief 132. A starter awl 180 may be selected based on the selected sizing disk 150.

As shown in FIG. 10D, the starter awl 180 is delivered through the guide feature 104 to create a pilot hole in line with the diaphysis axis. The pilot hole may extend toward or through the canal and in some techniques can extend at least the length of the final implant 190. Although not shown, after creating the pilot hole, different sized awls or sounders may be utilized to compact or otherwise prepare bone.

After creating the pilot hole, a compactor 172 may be selected based on the size and shape of the final implant 190. As shown in FIG. 10E, the compactor 172 may be delivered using an inserter handle 174. The tip of the compactor 172 is placed into the pilot hole until the depth stop 176 rests on the resected surface of the humerus around the concave surface formed by reaming, as discussed above. Multiple sized compactors 172 may be utilized to get up to the size of the desired final implant 190.

Figure 10F:
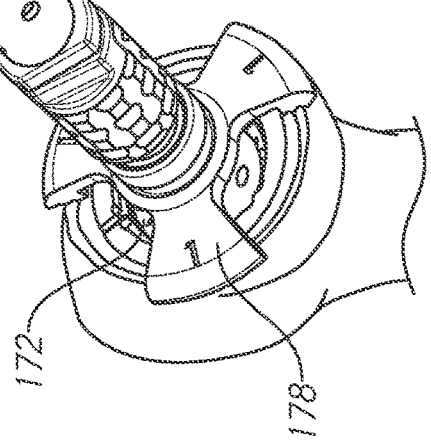
Figure 10E:
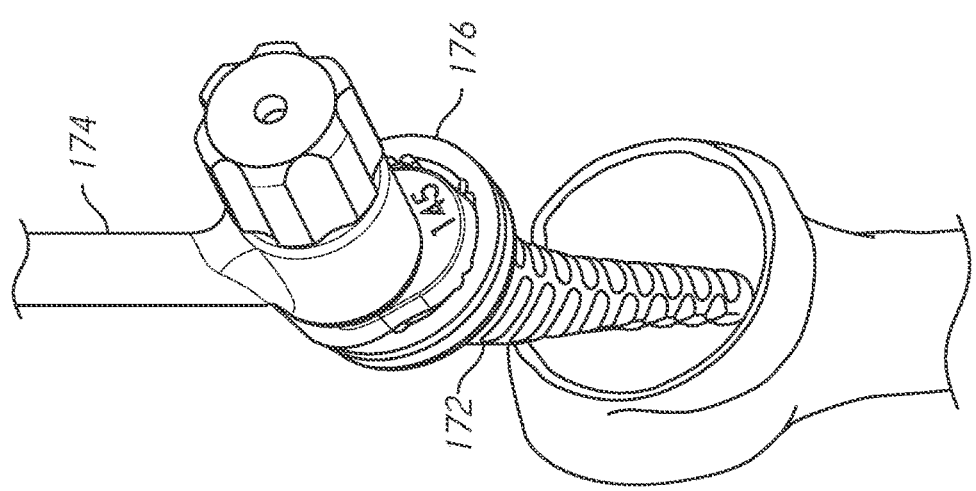
Figure 10I:
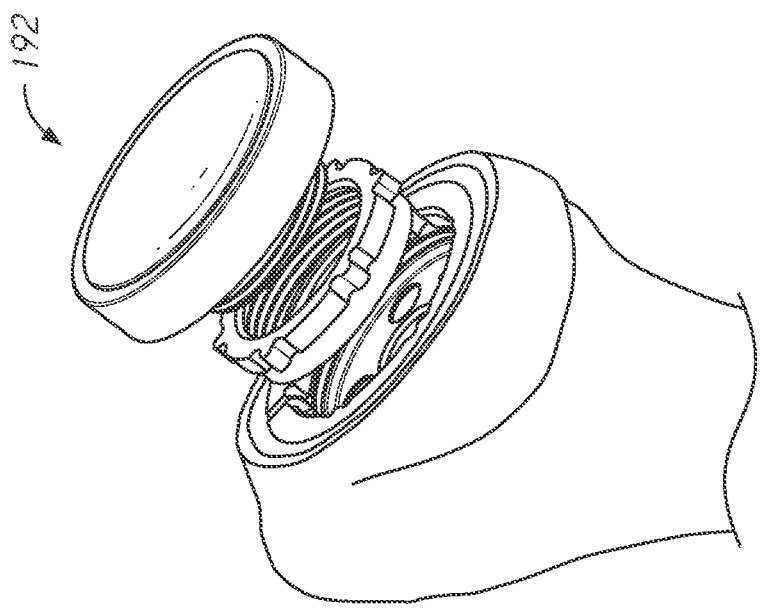
Figure 10H:
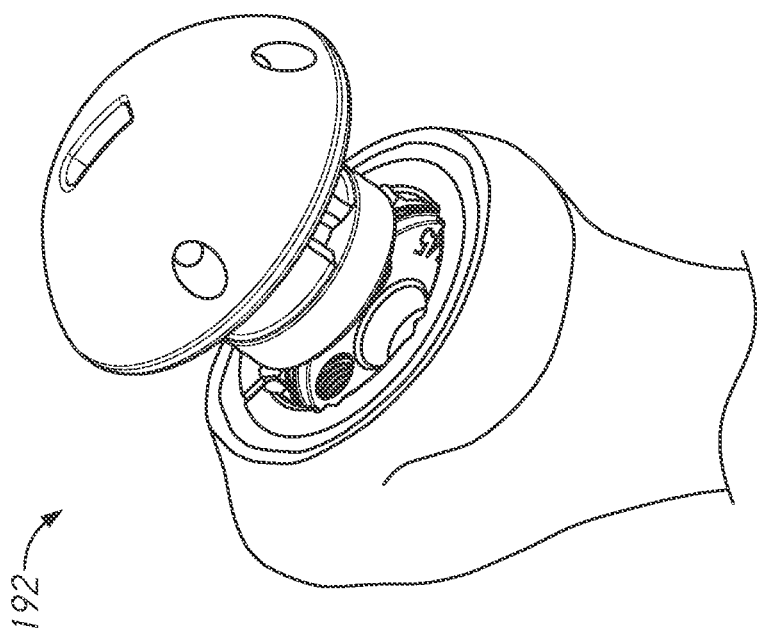
Figure 10K:
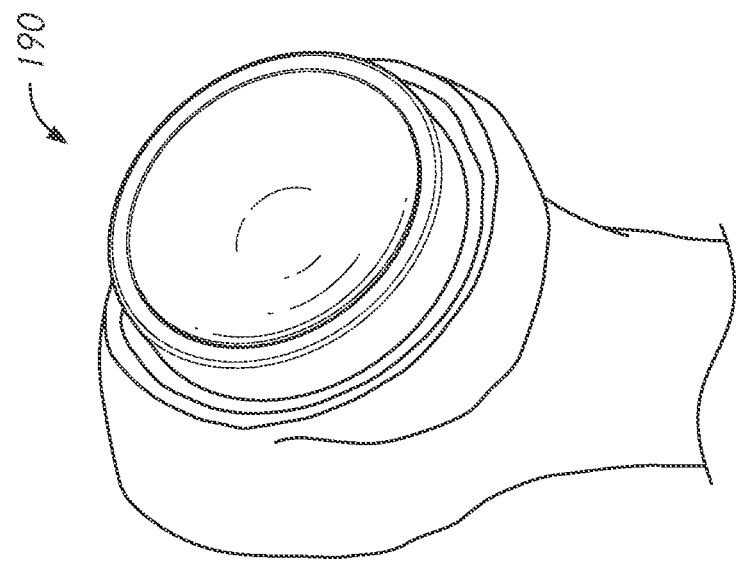
Figure 10J:
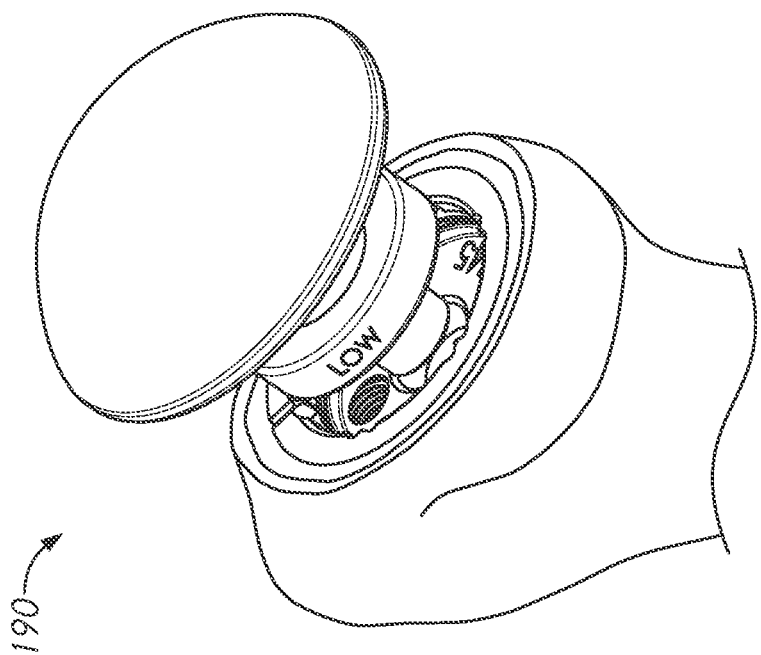

With the compactor 172 in place, a surface planer 178 may be utilized to ensure a flat resection true to the implant (see FIG. 10F). An appropriately sized surface planer 178 may be selected based on the selected sizing disk 150. While preparing the glenoid or during other surgical steps not involving humeral preparation, an appropriately sized cut protector 182 may be provided on the resection surface to protect the resection from retractors. The protector 182 may be selected based on the selected sizing disk 150.

After the humeral bone has been prepared, an anatomical trial implant (FIG. 10H) or a reverse trial implant (FIG. 10I) may be positioned in the humeral bone. Thereafter, the trial implant 192 may be removed, and the final anatomical implant (FIG. 10J) or final reverse implant (FIG. 10K) may be implanted. The final anatomical implant can take any suitable configuration, such as any that are described in Application No. PCT/US2019/054005, titled "SHOULDER STEMLESS CONVERTIBLE BONE ANCHOR," and Application No. PCT/US2019/054007, titled "MODULAR HUMERAL HEAD," which are filed on Oct. 1, 2019, the same day as the present application. The final anatomical implant can take any configuration as disclosed in Application No. 62/908,725, titled "SHOULDER STEMLESS CONVERTIBLE BONE ANCHOR," filed on Oct. 1, 2019, the same day as the present application.

As mentioned above, the surgeon may be provided with an instrumentation kit including a plurality of sizing disks 150 and a plurality of humeral guides 100 (or humeral guides 200, 300, 400, 500). The different components can be designed to transfer the shape of each available final implant to the bone. For example, the kit may include at least three different-sized disks 150. Each sizing disk 150 can include at least two different inclination angles. Thus, the kit can include at least three different sized humeral guides 100. Each humeral guide size can have at least two different guide feature 104 orientations for different inclination angles. Further, each humeral guide size can include a corresponding sized starter awl or other starter tool.

Figure 11:
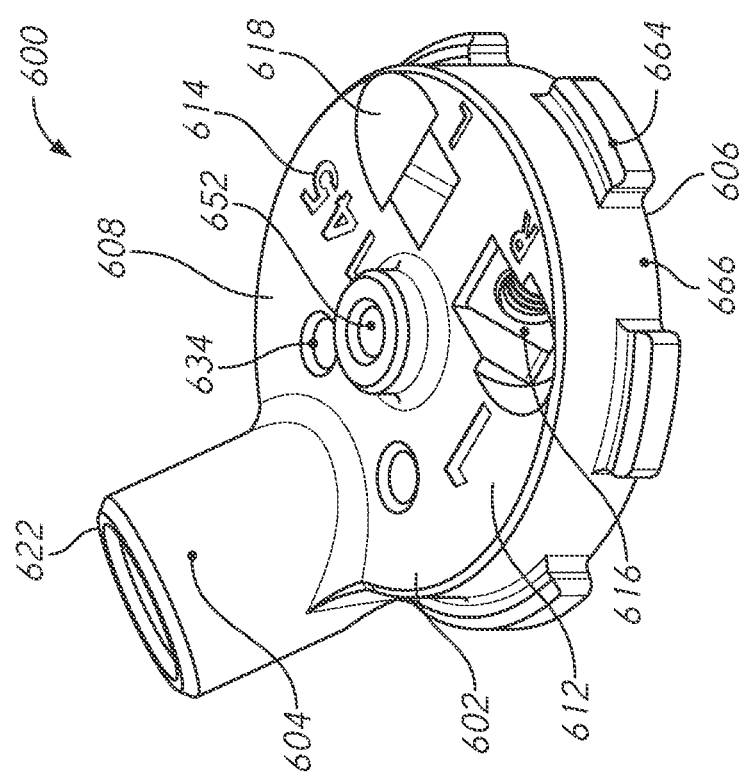
FIG. 11 illustrates another humeral guide including an integrated sizing feature.

FIG. 11 illustrates a humeral guide 600 with integrated sizing features and functions. The humeral guide 600 allows the surgeon to create the pilot hole in the humerus toward or into the medullary canal prior to reaming the metaphysis. Because the humeral guide 600 has integrated metaphyseal sizing, the guide 600 still allows for metaphyseal referencing while forming the pilot hole as part of preparing the diaphysis. The humeral guide 600 can include any of the features described above with respect to humeral guides 100, 200, 300, 400, and 500.

As discussed above, the humeral guide 600 includes a base 602 and a guide feature 604. The base 602 includes a first or lateral surface 606 configured to contact the metaphysis and a second or medial surface 608 opposite the first surface 606.

As shown in FIG. 11, the first surface 606 has a planar profile or configuration. As described in greater detail below, the humeral guide 600 is positioned on the bone after the superior or proximal end portion of the humerus is resected, but before the resected surface is reamed. Thus, the first surface 606 can be formed on or can be disposed in a single plane.

The second surface 608 can include an indicator, for example text, color, surface modifications, etc., e.g., a size indicator 612 of a particular size and/or inclination angle indicator 614 of a particular angle of the humeral guide 600.

As detailed further below, the humeral guide 600 can form part of a kit including a plurality of humeral guides 600. The humeral guides 600 may vary in size as indicated by the size indicator 612 and/or provide different inclination angles between the guide feature 604 and the base 602 as indicated by the inclination angle indicator 614. The inclination angle can be representative of a resection angle or a stem inclination angle, e.g., between an axis extending through a distal end of the stem and an axis extending through a proximal face of the stem, of the final implant. The inclination angle can provide the angle between the metaphyseal bowl and the stem. As shown, the humeral guide 600 has an inclination angle of 145 degrees, but the humeral guide 600 may have other inclination angles, for example between 125 degrees and 155 degrees, e.g., 135 degrees.

The base 602 is configured to be centered within an outer periphery of the metaphysis so that the final implant centered on the same portion of the resected humerus upon which the base 602 is centered, in use, does not break through a proximal portion of the cortical bone. The humeral guide 600 can include an arcuate body, e.g., a circular body 666, representative of the diameter or major axis of a proximal face of a stem of the final implant 190 to be located at the resection plane of the humerus (see FIG. 3C). The diameter of the circular body 666 may vary between the different sized humeral guides 600. Each humeral guide 600 can include a sizing indicator 612 representative of the size of the humeral guide 600. As described in more detail below, the selected humeral guide 600 can indicate the size of at least some of the tools the surgeon should use to prepare the bone.

As shown in FIG. 11, the humeral guide 600 may include one or more tabs 664 or other sizing features extending transversely, e.g., radially outward from the circular body 666. The tabs 664 can be radial projections formed on or extending from a circumferential surface of the guide 600. The projections can extend to a free end. The radial length of the tabs between the circumferential surface and the free end can be indicative of size, as discussed below. The tabs 664 facilitate visualization of the space between the implant to be implanted (visualized with reference to the circular body 666) and the cortical boundary of the bone. If the outer periphery of the humeral guide 600 hangs over the inner cortical boundary, then the surgeon should select a different sized, e.g., a smaller, humeral guide 600. The thickness (also referred to herein as radial length) of the tabs 664 measured from the circular body 666 to the outer periphery of the tabs 664 can change between the different humeral guides 600.

The surgeon may prefer to use a handle to position the humeral guide 600 on the anatomy. Accordingly, the second surface 608 can optionally include one or more handle attachment features 616, 618 configured to interface with a modular handle. As shown in FIG. 11, the humeral guide 100 can include a right handle attachment feature 616 and a left handle attachment feature 618, depending on the arm being prepared, preferences of the surgeon, and/or or attachment interface on the handle. For example, the right handle attachment feature 116 is accessible through an anterior incision accessing the right arm, while the left handle attachment feature 118 is accessible through an anterior incision accessing the left arm. The handle attachment features 616, 618 can be positioned at an inferior region of the humeral guide 600. For example, each handle attachment feature 616, 618 can be an angled opening on a second surface 608 of the humeral guide 600.

The guide feature 604 of the humeral guide 600 can be disposed on or accessible from the second surface 608. The guide feature 604 defines a lumen extending from a proximal opening 622 of the guide feature 604 to a distal opening of the base 602 such that a tool can be advanced through the humeral guide 600. The guide feature 604 is configured to guide a tool into a diaphysis of the humerus bone along a central portion of a canal in the diaphysis. The guide feature 604 can be positioned at a superior side or region of the base 602 so the guide feature 604 can guide a tool into the diaphysis.

Although not required, the guide feature 604 can extend outwardly from (proximally or medially of) a surface of the base 602 to provide additional stabilization and support for the tool. For example, as shown in FIG. 11, the guide feature 604 extends away from the second surface 608. The guide feature 604 can have a cylindrical profile. In other configurations, the proximal opening 622 of the guide feature may be positioned at or flush with the second surface 608.

Any of the guides or sizing disks described herein can include one or more stabilization features, such as stabilization holes 634 extending through the base 602 or barbs or other anchors on the first surface 606. One or more stabilization pins can be driven through a respective stabilization hole 634 to hold the guide 600 in place during diaphyseal preparation. As shown in FIG. 11, the one or more stabilization holes 634 can be offset from the center of the guide 600 and/or positioned at an oblique angle away from the central axis of the base 602 or canal, so the stabilization pins do not obstruct the tool being delivered through the guide 604. After a pilot hole is created in line with the diaphysis axis, a central guide pin can be driven through a cannulation hole 652 to guide other instruments.

FIGS. 12A-12D illustrate a method of implanting a final implant using the humeral guide 600.

After the surgeon gains access to the humeral head, the superior or proximal end portion of the humerus is resected. The surgeon may be provided with one or more humeral guides 600 to determine a size of the metaphysis and evaluate the diaphysis, for example, two, three, four, or more different sized humeral guides. As explained above, each humeral guide 600 can include an arcuate body, e.g., a circular body 666, representative of the diameter of a proximal face of a stem of the final implant 190. Each humeral guide 600 can also include one or more sizing features (e.g., tabs 664) to facilitate visualization of the space between the implant to be implanted (visualized with reference to the circular body 666) and the cortical boundary of the bone. The selected humeral guide 600 can indicate the size of at least some of the tools and/or implants the surgeon should use to prepare the bone.

Figures 12A, 12B:
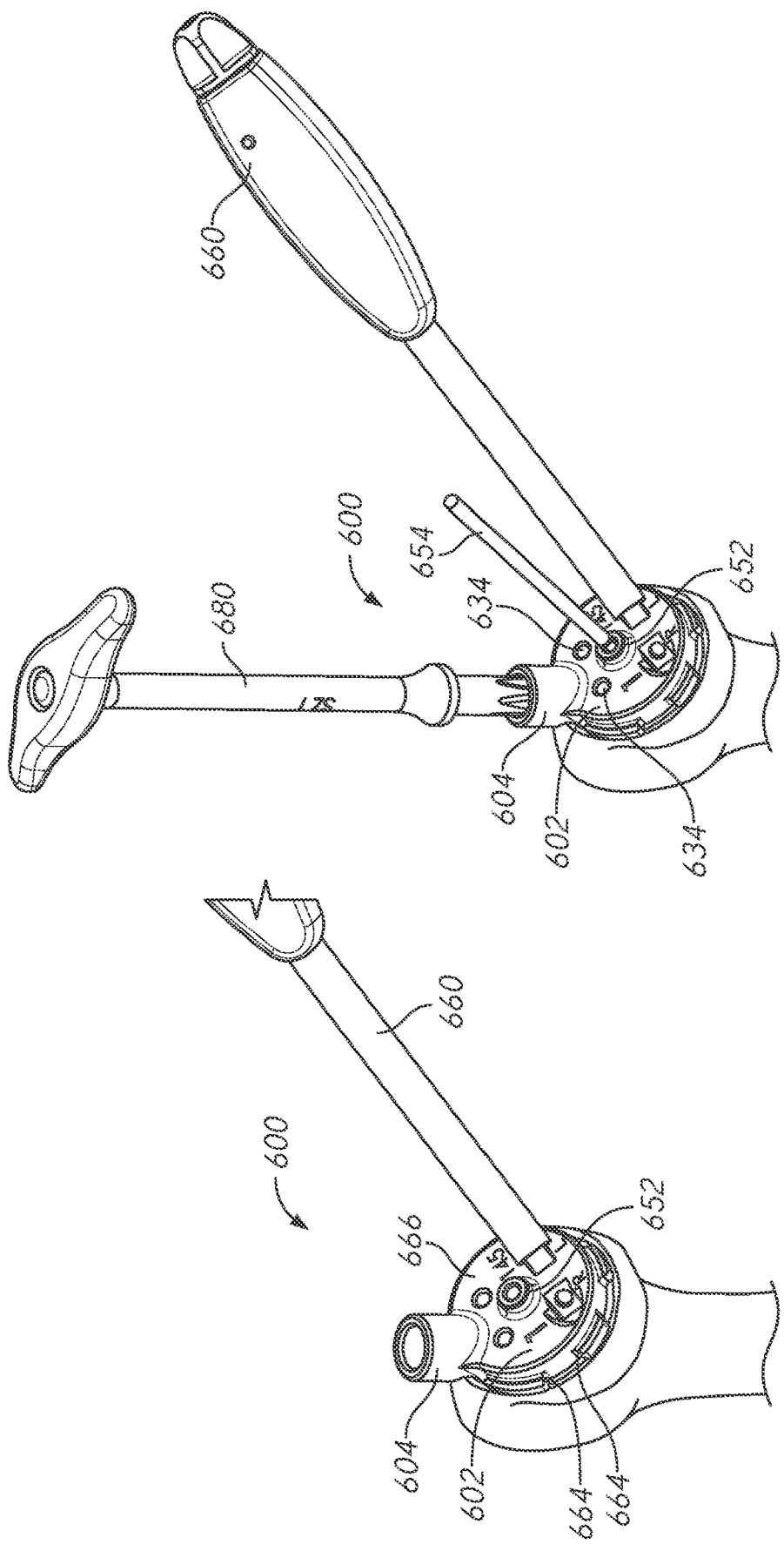
FIGS. 12A-12D illustrate a technique for positioning an implant using the humeral guide shown in FIG. 11.

As shown in FIG. 12A, optionally, each humeral guide 600 can be positioned using a modular handle 660. The surgeon will select the appropriate humeral guide 600 that centers a cannulation hole 652 at the center of the resection surface and fits within the cortical boundary of the resected surface, but does not hang over the periphery of the resected surface. The cannulation hole 652 is configured to receive a central guide pin 654 that subsequently is used to center other humeral preparation instruments (see FIG. 12B).

Within each size, the surgeon may be provided with or may select one or more humeral guides 600 having different inclination angles, which can represent an angle relative to the face of the resection surface or the stem inclination angle of the final implant stem to be implanted. The inclination angle allows the surgeon to evaluate approximate stem axis position relative to the humeral canal before committing to the bowl placement in the metaphysis. The cylindrical extension of the guide feature 604 can provide a visual indicator of the inclination angle to help the surgeon select the appropriate inclination angle and/or verify that the angle of the resected surface is appropriate. If the cylindrical extension of the guide feature 604 is not in line with or parallel the diaphysis axis Y, then the angle of the resected surface may be off and the surgeon can recut the resected surface or make another adjustment to improve the positioning in the humerus.

After selecting the appropriate humeral guide 600, optionally, one or more stabilization pins can be driven through a respective stabilization hole 634 to hold the guide 600 in place during diaphyseal preparation. The starter awl 680 or other tool is delivered through the guide feature 604 to create a pilot hole in line with the diaphysis axis. The pilot hole may extend toward or through the canal and in some techniques can extend at least the length of the final implant 190. Although not shown, after creating the pilot hole, different sized awls or sounders may be utilized to compact or otherwise prepare bone. At any time, for example after the pilot hole is created, the central guide pin 654 may be driven through the cannulation hole 652 to guide other instruments.

Figure 12D:
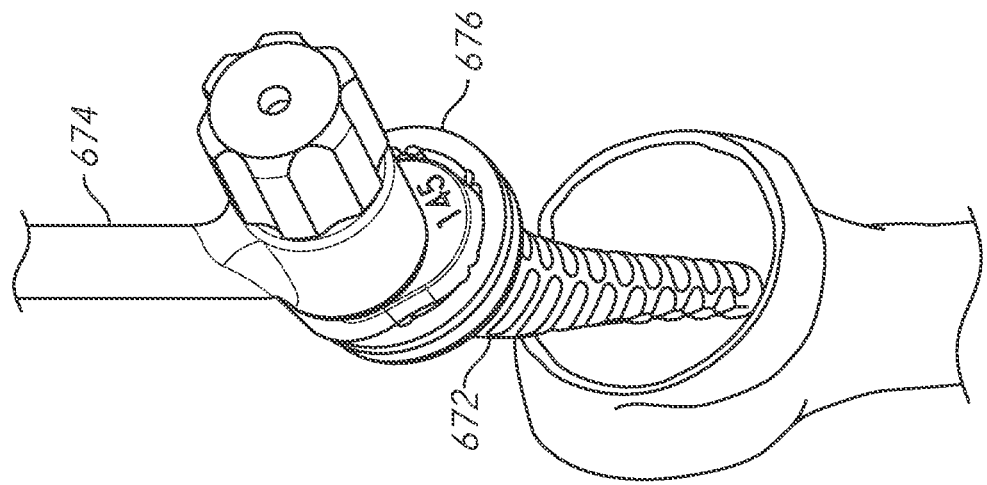
Figure 12C:
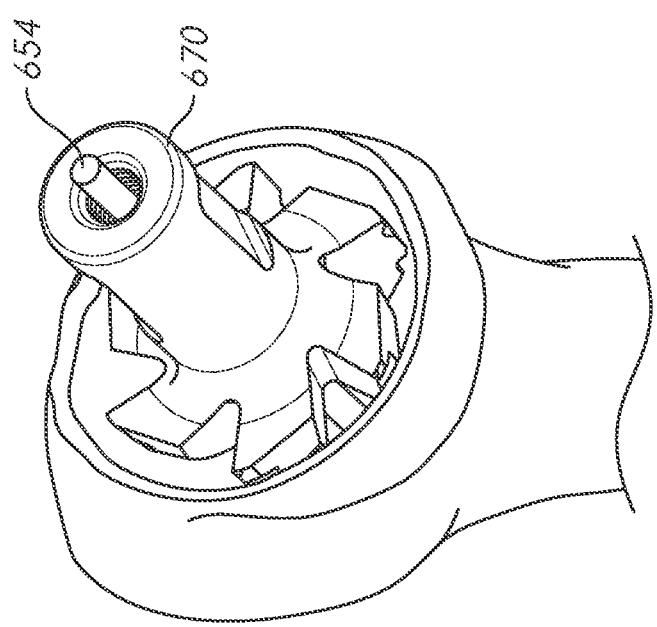

After creating the pilot hole, a corresponding sized reamer 670 may be selected and delivered over the central guide pin 654 to ream the metaphysis (see FIG. 12C). After reaming, a compactor 672 may be selected based on the size and shape of the final implant. As shown in FIG. 12D, the compactor 672 may be delivered using an inserter handle 674. The tip of the compactor 672 is placed into the pilot hole until the depth stop 676 rests on the resected surface of the humerus around the concave surface formed by reaming, as discussed above. Multiple sized compactors 672 may be utilized to get up to the size of the desired final implant.

Following compacting, the same preparation steps described above with respect to FIGS. 10F-10K may be utilized.

Any of the guides described herein may have a patient specific design that matches the metaphyseal and diaphyseal axes of the patient's bone. The guides can be generated based on pre-operative or intra-operative imaging, such as CT scan, MRI scan, X-ray, or other imaging, and formed utilizing, for example, 3-D printing technology or the like.

FIGS. 13A-13C illustrate another humeral guide 700. The humeral guide 700 can include any of the features discussed above with respect to any one or more of humeral guides 100, 200, 300, 400, 500, and 600.

As shown in FIGS. 13A-13C, the humeral guide 700 includes the base 702 and a guide feature 704. The base 702 includes a first or lateral surface 706 configured to contact the metaphysis and a second or medial surface 708 opposite the first surface 706. The first surface 706 has a planar profile or configuration (see FIG. 13C). However, the first surface 706 can take on any profile, including spherical, tiered, conical, cylindrical, or otherwise, for example depending on how the metaphysis is prepared.

The second surface 708 can include one or more indicators, for example text, color, surface modifications, etc., e.g., a size indicator of a particular size and/or inclination angle indicator of a particular angle of the humeral guide 700. As shown in FIG. 13A, the humeral guide 700 may include two different size indicators 712, e.g., a text indicator and a color indicator.

The base 702 is configured to be centered within an outer periphery of the metaphysis so that the final implant at least partially centered on the same portion of the resected humerus upon which the base 702 is centered, in use, does not break through a proximal portion of the cortical bone. The humeral guide 700 can include an arcuate body, e.g., a circular or partial circular body 766, representative of the diameter or major axis of a proximal face of a stemmed or stemless anchor of the final implant 190 to be located at or adjacent to resection plane of the humerus (see FIG. 3C). The diameter of the circular body 766 may vary between the different sized humeral guides 700.

The humeral guide 700 may include a depth stop 726 configured to control a depth of the humeral guide 700 relative to the bone. The shape and/or size of the depth stop 726 may correspond to the shape and/or size of a collar on the final implant. The second surface 708 may have a greater diameter and project radially outward of the first surface 706, thus forming the depth stop 726. However, as described in earlier examples, the depth stop 726 can be a modular component separately attached to a guide. As explained further below, the depth stop 726 rests on a recessed surface in the bone in some techniques.

The guide feature 704 of the humeral guide 700 can be disposed on or accessible from the second surface 708. The guide feature 704 defines a lumen extending from a second opening 722 of the guide feature 704 to a first opening 705 of the base 702 such that a tool can be advanced through the humeral guide 700 (see FIG. 14). A rear side of the humeral guide may include an open channel 721 from the guide feature lumen to the first opening 705. The open channel 721 prevents the guide feature 704 from impinging on the resection. Although not required, the guide feature 704 can extend outwardly from (laterally of) a surface of the base 702 to provide additional stabilization and support for the tool. The guide feature 704 can have a cylindrical profile. In other configurations, the second opening 722 of the guide feature 704 may be positioned at or flush with the second surface 708.

The guide feature 704 is configured to guide a tool into a diaphysis of the humerus bone along a central portion of a canal in the diaphysis. The guide feature 704 can be positioned at a superior side or region of the base 702 so the guide feature 704 can guide a tool into the diaphysis.

The humeral guide 700 may also include a retroversion indicator 728, for example on the guide feature 704. As the retroversion rod 730 on the awl 780 is moved relative to the guide feature 704, the retroversion rod 730 allows the surgeon to evaluate the version (see FIG. 14). For example, when the retroversion rod 730 is pointed toward a patient's elbow and parallel with a long axis of the forearm, the position of the indicator 781 on the awl 780 relative to the retroversion indicator 728 provides information on the version. If the proximal humeral resection was not accurate (for example, if the indicator 781 is entirely offset from the retroversion indicator 728) or for other reasons dictated by surgeon judgement, the surgeon can modify the version by adjusting the guide 700 to an appropriate version angle. This technique can also be used to fine tune stem access as controlled by the guide 700 as discussed above.

The surgeon may prefer to use a handle 760 to position the humeral guide 700 on the anatomy (see FIG. 16B). The humeral guide 700 can optionally include one or more handle attachment features 716, 718 configured to interface with a modular handle 760. The handle attachment features 716, 718 can extend from the second surface 708 in a central region thereof. For example, each handle attachment feature 716, 718 can be an opening extending in a transverse direction or perpendicular to a longitudinal axis L of the humeral guide 700 on a projection 717 extending from the second surface 708. Providing the handle attachment features 716, 718 in the central region of the humeral guide 700 prevents the guide from tilting when manipulating the handle.

The humeral guide 700 may form part of a kit including a plurality of humeral guides 700. The humeral guides 700 may vary in size as indicated by the size indicator 712. As explained above, the size of the humeral guide 700 may be selected based on a selected sizing desk that indicates the size of at least some of the tools and/or implants the surgeon should use to prepare the bone.

The kit may also include humeral guides 700 with different inclination angles between the guide feature 704 and the base 702. The inclination angle can be representative of a resection angle or a stem inclination angle, e.g., between an axis extending through a distal end of the stem and an axis extending through a proximal face of the stem of the final implant. The inclination angle can be measured between an axis aligned with a central longitudinal axis of an elongate distal portion of a stem and an axis extending perpendicular to a proximal face of the stem of the final implant. The inclination angle can be measured between an axis aligned with a central longitudinal axis of the humerus and an axis extending perpendicular to a proximal face of a humeral anchor with or without a stem portion. The inclination angle can provide the angle between a metaphyseal bowl portion and a stem portion of an implant. As shown, the humeral guide 700 has an inclination angle of 145 degrees, but the humeral guide 700 may have other inclination angles, for example angles of or between 125 degrees and 155 degrees, e.g., 135 degrees.

Figure 14:
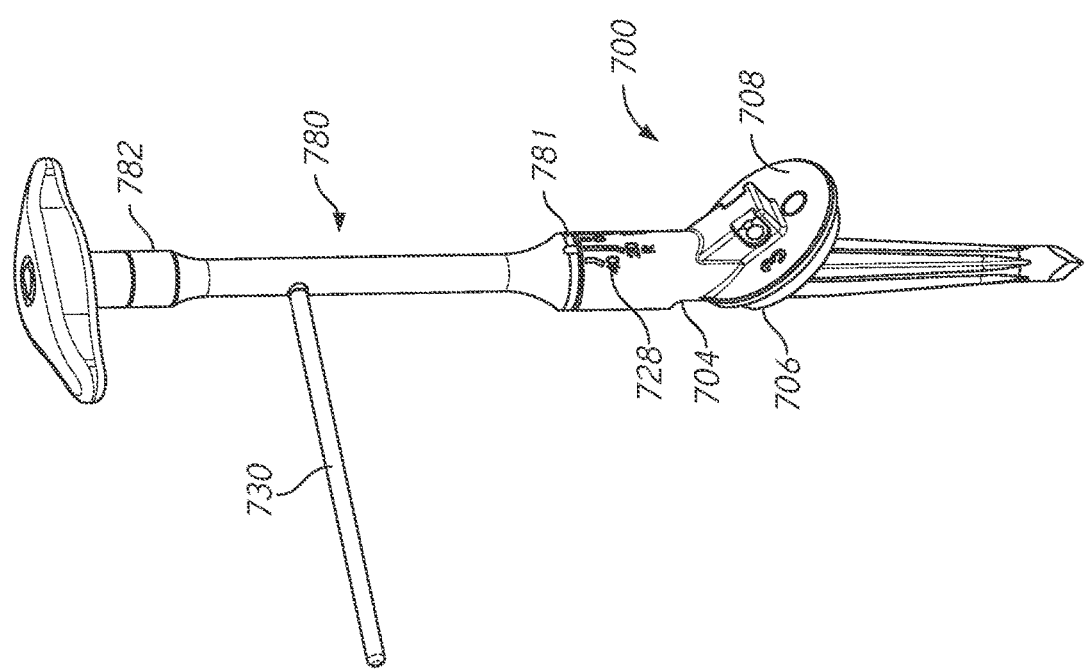
FIG. 14 illustrates the humeral guide shown in FIG. 13A with an awl extending through the guide feature.

FIG. 14 shows the humeral guide 700 with an awl 780 extending through the guide feature 704. The awl 780 may correspond to the selected size of the humeral guide 700. As shown in FIG. 14, the awl 780 may include a size indicator 782, for example a size specifying text, color, surface modifications, or combination of two or more such indicators. A single awl 780 may be suitable for more than one sized humeral guide 700.

FIGS. 15A-15C show another humeral guide 800 that resembles the humeral guide 700 except as described below. Accordingly, numerals used to identify features of the humeral guide 700 are incremented by a factor of one hundred (100) to identify like features of the humeral guide 800. The description of the guide 700 will be considered to supplement the description of the guide 800 where consistent rather than repeating such descriptions. Similarly the descriptions of the guide 800 may supplement those of the guide 700.

As described above, the surgeon may prefer to use a handle to position the humeral guide on the anatomy. Accordingly, as shown in the FIGS. 15A-15C, the humeral guide 800 can optionally include one or more handle attachment features 816, 818 configured to interface with a modular handle (e.g., the handle 760 in FIG. 16B). The handle attachment features 816, 818 can be positioned at an inferior region of the humeral guide 800. For example, each handle attachment feature 816, 818 can be an opening extending in a transverse direction or perpendicular to a longitudinal axis L of the humeral guide 800. The handle attachment features 816, 818 can be disposed on a portion of the base 802 opposite to the guide feature 804. The handle attachment features 816, 818 can be located inferior of (or distal of) a second surface 808 of the guide 800. Providing the handle attachment features 816, 818 at the periphery of the base 802 makes it easier to machine the handle attachment features 816, 818.

As described above, a rear side of the humeral guide may include an open channel from the guide feature lumen to the first opening on the first surface of the humeral guide. However, other configurations are possible. For example, as shown in FIG. 15C, a rear side of the guide feature 804 may include a channel 821 providing access to the lumen of the guide feature 804. This channel 821 may be distinct from the first opening 805 on the first surface 806 of the humeral guide 800.

FIGS. 16A-16B illustrate a method of implanting a final implant using the humeral guide 700.

After the surgeon gains access to the humeral head, the superior or proximal end portion of the humerus is resected. The surgeon may evaluate the size of the metaphysis using any of the techniques described herein. For example, the surgeon may be provided with one or more sizing disks to determine a size of the metaphysis. Using the selected sizing disk, the surgeon can place a pin.

After selecting the appropriate sizing disk, a corresponding sized reamer 770 may be selected and delivered over the guide pin 754 to ream the metaphysis (see FIG. 16A). The guide pin 754 can be placed in the resected humerus using the selected sizing disk. The reamer 770 produces a cavity in the resected humerus. The cavity may be hemispherical, cylindrical, tiered, conical, or another shape such as including two or more cylindrical areas. For example, the reamer 770 may include a distal portion 773 configured to form a recess or surface in the metaphysis that generally matches the shape of the metaphyseal portion of a stemmed implant or all or a portion of an external surface of an anchor of a stemless implant, e.g., being an inverse thereof. The reamer 770 may also include a proximal portion 771 configured to form a recessed surface or counter sunk area below the resection plane. The recessed surface may surround at least a portion of the opening of the cavity. The recessed surface can be shaped to receive the depth stop 726 of the humeral guide 700 or the collar of a final implant. As shown in FIG. 16B, the humeral guide 700 is positioned in the bone such that the second surface 708 is flush with resection plane.

As shown in FIG. 16B, optionally, each humeral guide 700 can be positioned using a modular handle 760. The surgeon will select the appropriate humeral guide 700 based on the selected sizing disk. When positioned on the bone, the humeral guide 700 fits within the cortical boundary of the resected surface, but does not hang over the periphery of the resected surface.

Within each size, the surgeon may be provided with or may select one or more humeral guides 700 having different inclination angles, which can represent an angle relative to the face of the resection surface or the stem inclination angle of the final implant stem to be implanted. The inclination angle allows the surgeon to evaluate approximate stem axis position relative to the humeral canal before committing to the bowl placement in the metaphysis. The cylindrical extension of the guide feature 704 can provide a visual indicator of the inclination angle to help the surgeon select the appropriate inclination angle and/or verify that the angle of the resected surface is appropriate. If the cylindrical extension of the guide feature 704 is not in line with or parallel the diaphysis axis, then the angle of the resected surface may be off and the surgeon can recut the resected surface or make another adjustment to improve the positioning in the humerus.

After placing the appropriate humeral guide 700, the starter awl 780 or other tool is delivered through the guide feature 704 to create a pilot hole in line with the diaphysis axis. The pilot hole may extend toward or through the canal and in some techniques can extend at least the length of the final implant. Although not shown, after creating the pilot hole, different sized awls or sounders may be utilized to compact or otherwise prepare bone.

After reaming, a compactor may be selected based on the size and shape of the final implant. Compacting and following steps may include the same steps described above with respect to FIGS. 10E-10K.

Any of the guides described herein may have a patient specific design that matches the metaphyseal and diaphyseal axes of the patient's bone. The guides can be generated based on pre-operative or intra-operative imaging, such as CT scan, MRI scan, X-ray, or other imaging, and formed utilizing, for example, 3-D printing technology or the like.

Terminology

As used herein, the relative terms "lateral" and "medial" shall be defined relative to the anatomy. Thus, medial refers to the direction toward the midline and lateral refers to the direction away from the midline.

Although certain embodiments and examples have been described herein, it will be understood by those skilled in the art that many aspects of the delivery systems shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±1%, ±5%, ±10%, ±15%, etc.). For example, "about 0.01 inches" includes "0.01 inches." Phrases preceded by a term such as "substantially" include the recited phrase and should be interpreted based on the circumstances (e.g., as much as reasonably possible under the circumstances). For example, "substantially linear" includes "linear."

What is claimed is:

1. A humeral guide for providing proper alignment of a stem portion of an implant within a diaphysis of a humerus bone and a proximal portion of the implant in a metaphysis of the humerus bone, the humeral guide comprising:
   a base comprising:
      a first surface configured to be disposed within a cavity formed in the metaphysis such that the first surface contacts the metaphysis, and
      a second surface separated from the first surface by a depth stop, the depth stop extending radially outwardly from the first surface and including a contact surface configured to engage a recessed or resected surface of the humerus, wherein the first surface of the base is sized to fit within an outer periphery of the metaphysis; and
   a guide feature extending from the second surface and defining a lumen having a central axis, the lumen being configured to guide a tool into a diaphysis of the humerus bone along a central portion of a canal in the diaphysis, the guide feature positioned at a superior region of the base.

2. The humeral guide of claim 1, wherein the first surface of the base comprises a curvature.

3. The humeral guide of claim 1, wherein the first surface of the base is planar.

4. The humeral guide of claim 1, wherein the guide feature extends outwardly from the base to provide additional support for the tool.

5. The humeral guide of claim 1, further comprising a handle attachment feature at an inferior region of the base, the handle attachment feature configured to interface with a modular handle for positioning the humeral guide.

6. The humeral guide of claim 1, further comprising a handle attachment feature extending from a central region of the second surface.

7. The humeral guide of claim 1, wherein the depth stop is a modular component configured to interface with the base.

8. The humeral guide of claim 5, wherein the base further comprises a stabilization hole between the handle attachment feature and the guide feature.

9. The humeral guide of claim 5, wherein the base further comprises a cannulation hole configured to receive a cannulation pin, the cannulation hole positioned between the handle attachment feature and the guide feature.

10. The humeral guide of claim 1, wherein the base further comprises a plurality of sizing features extending radially outward of the base.

11. The humeral guide of claim 1, wherein the guide feature comprises a retroversion indicator.

12. A kit comprising:
   the humeral guide of claim 1; and a second humeral guide comprising:
a second base and a second guide feature having a central axis disposed to guide the tool into the diaphysis of the humerus bone,
wherein a diameter of the second base is different from a diameter of the base.

13. The kit of claim 12, wherein an inclination angle between the guide feature and the base is the same as a second inclination angle between the second guide feature and the second base.

14. The kit of claim 12, wherein an inclination angle between the guide feature and the base is different from a second inclination angle between the second guide feature and the second base.

15. The kit of claim 12, further comprising a plurality of sizing disks, each sizing disk corresponding to one of a plurality of humeral guides, the plurality of humeral guides comprising the humeral guide and the second humeral guide.

16. A method of preparing a humerus bone, the method comprising:
resecting an end portion of the humerus bone to form a resected surface defining a resection plane;
sizing a proximal portion of the humerus bone;
positioning a central guide pin in the humerus bone;
reaming a proximal portion of the humerus bone to form a cavity;
selecting a humeral guide based on a size of the proximal portion of the humerus bone, the humeral guide comprising:
a base including:
a first surface configured to be disposed within the cavity such that the first surface contacts a metaphysis of the humerus bone,
a second surface separate from the first surface by a depth stop, the depth extending radially outwardly from the first surface and including a contact surface configured to engage at least one of the resected surface of the humerus or a recessed surface of the humerus, and
a guide feature extending from the second surface and defining a lumen having a central axis, the lumen configured to guide a tool into a diaphysis of the humerus bone along a central portion of a canal in the diaphysis, the guide feature positioned at a superior region of the base;
positioning the selected humeral guide on the proximal portion of the humerus bone such that the first surface is disposed within the cavity and contacts the metaphysis of the humerus bone;
guiding a tool through the lumen defined by the guide feature of the selected humeral guide and along the central portion of the canal in the diaphysis; and
forming a pilot hole using the tool.

17. The method of claim 16, further comprising attaching a handle to the humeral guide and positioning the humeral guide using the handle.

18. The method of claim 16, wherein the central guide pin is positioned using the selected humeral guide.

19. The method of claim 16, wherein after reaming the proximal portion of the humerus bone, guiding the tool along the central portion of the canal in the diaphysis.

20. The method of claim 16, wherein before reaming the proximal portion of the humerus bone, guiding the tool along the central portion of the canal in the diaphysis.

21. The method of claim 16, wherein sizing a proximal portion of the humerus bone comprises selecting one of a plurality of sizing disks.

22. The method of claim 21, wherein the central guide pin is positioned using the selected sizing disk.

23. The method of claim 16, reaming a proximal portion of the humerus bone comprising forming the cavity and the recessed surface below the resection plane.

24. The method of claim 23, wherein forming the cavity comprises forming a concave surface.

25. The method of claim 23, wherein forming the cavity comprises forming a tiered cavity.

26. The method of claim 23, wherein positioning the selected humeral guide comprises advancing the selected humeral guide until the depth stop of the humeral guide contacts the recessed surface of the humerus.

27. The method of claim 16, wherein positioning the selected humeral guide comprises advancing the selected humeral guide until the depth stop of the humeral guide contacts the resected surface of the humerus defining the resection plane.

28. A system sizing and guiding a tool into a diaphysis of a humerus bone, the system comprising:
a sizing feature for sizing a proximal portion of the humerus bone;
a base comprising:
a first surface configured to be disposed within a cavity formed in a metaphysis of the humerus bone such that the first surface contacts a proximal portion of the humerus bone, and
a second surface separated from the first surface by a depth stop, the depth stop extending radially outwardly from the first surface and including a contact surface configured to engage a recessed or a resected surface of the humerus; and
a guide feature extending from the second surface and defining a lumen having a central axis, the lumen configured to guide a tool into a diaphysis of the humerus bone along a central portion of a canal in the diaphysis.

29. The system of claim 28, wherein the sizing feature is a sizing disk separate from the base.

30. The system of claim 28, wherein the sizing feature extends radially outward from the base.

31. The system of claim 28, wherein the first surface of the base comprises a curvature.

32. The system of claim 28, wherein the first surface of the base is planar.

33. The system of claim 28, wherein the guide feature extends outwardly from the base.

34. The system of claim 28, wherein the guide feature extends from a superior region of the second surface of the base.

35. The system of claim 28, wherein the depth stop is a modular component configured to interface with the base.

36. The system of claim 28, wherein the base further comprises a cannulation hole configured to receive a cannulation pin, the cannulation hole positioned between a handle attachment feature and the guide feature.

37. The system of claim 28, wherein the guide feature comprises a retroversion indicator.

* * * * *